United States Patent
Mortensen et al.

(10) Patent No.: US 11,489,916 B1
(45) Date of Patent: Nov. 1, 2022

(54) COMPUTING NETWORKS AND SYSTEMS FOR SUBMITTING DATA

(71) Applicant: Veeva Systems Inc., Pleasanton, CA (US)

(72) Inventors: Marius K. Mortensen, Burlington (CA); Asaf Roll, Richmond Hill (CA); Zhen Tan, North York (CA)

(73) Assignee: VEEVA SYSTEMS INC., Pleasanton, CA (US)

(*) Notice: Subject to any disclaimer, the term of this patent is extended or adjusted under 35 U.S.C. 154(b) by 0 days.

(21) Appl. No.: 17/548,227

(22) Filed: Dec. 10, 2021

Related U.S. Application Data

(63) Continuation of application No. 17/230,752, filed on Apr. 14, 2021, now Pat. No. 11,228,642.

(51) Int. Cl.
*H04L 67/10* (2022.01)
*G06F 16/25* (2019.01)

(52) U.S. Cl.
CPC ............ *H04L 67/10* (2013.01); *G06F 16/258* (2019.01)

(58) Field of Classification Search
CPC .............................. H04L 67/10; G06F 16/258
See application file for complete search history.

(56) References Cited

U.S. PATENT DOCUMENTS

| | | | | |
|---|---|---|---|---|
| 2005/0273600 A1* | 12/2005 | Seeman | ............... | G06F 21/6227 713/160 |
| 2009/0077133 A1* | 3/2009 | Hsu | ................... | G06F 16/122 |
| 2013/0290305 A1* | 10/2013 | Feng | .................... | H04L 67/12 707/722 |
| 2017/0063782 A1* | 3/2017 | Jain | ..................... | H04L 69/22 |
| 2017/0098100 A1* | 4/2017 | Yadgiri | ............... | G06F 21/6254 |
| 2017/0118084 A1* | 4/2017 | Gilliard | .................. | H04L 67/10 |
| 2018/0302410 A1* | 10/2018 | Venkataraman | .... | H04L 63/0263 |
| 2021/0135992 A1* | 5/2021 | Tidemann | ............... | H04L 45/28 |

* cited by examiner

*Primary Examiner* — Shean Tokuta
(74) *Attorney, Agent, or Firm* — Baker & McKenzie LLP

(57) ABSTRACT

Systems and methods are provided for submitting data in a computer network. An exemplary method includes: receiving a first request to process a first data at one or more data servers; determining whether the first data includes a plurality of first set of properties; generating a second data having a plurality of second set of properties; providing a plurality of rule sets for submitting the second data; analyzing the second data to determine which of the rule sets is applicable; selecting one or more applicable rules from the rule sets; generating a plurality of third data by applying the one or more applicable rules to the second data; identifying the one or more external sources to distribute the third data; and sending the third data to the one or more external sources.

20 Claims, 19 Drawing Sheets

FIG. 5

| STUDY SELECTOR | | | | | | | | | |
|---|---|---|---|---|---|---|---|---|---|
| All Studies | | | | | | | | | |
| ▼ VIEWS — 504 | Recent Inbox | | | | | | | | |
| ☐ All Inbox — 504a | Name | Lifecycle State | Due Date | Receipt Date | New Info Date | Report Type | Study | Product | Event (PT) | Seriousness |
| ⏱ Recent Inbox — 504b | AER1 ☆ ⚙ | L1 | DD1 | RT1 | NID1 | RT1 | ST1 | P1 | E1 | SR1 |
| ☆ Favorites — 504c | AER2 ☆ | L2 | DD2 | RT2 | NID2 | RT2 | ST2 | P2 | E2 | SR2 |
| ▼ FILTERS — 506 | AER3 ☆ | L3 | DD3 | RT3 | NID3 | RT3 | ST3 | P3 | E3 | SR3 |
| ▲ DUE DATE — 506a | AER4 ☆ | L4 | DD4 | RT4 | NID4 | RT4 | ST4 | P4 | E4 | SR4 |
| ▲ RECEIPT DATE — 506b | AER5 ☆ | L5 | DD5 | RT5 | NID5 | RT5 | ST5 | P5 | E5 | SR5 |
| ▲ NEW INFO DATE — 506c | AER6 ☆ | L6 | DD6 | RT6 | NID6 | RT6 | ST6 | P6 | E6 | SR6 |
| ▲ REPORT TYPE — 506d | | | | | | | | | 1-6 of 6 |
| ▲ STUDY — 506e | | | | | | | | | |
| ▲ PRODUCT — 506f | | | | | | | | | |
| ▲ SERIOUSNESS — 506g | | | | | | | | | |
| ▲ RELATEDNESS — 506h | | | | | | | | | |

500, 502, 508

Case: N2

- Details — 604
- Device Details — 604a
- Contacts (1) — 604b
- Patient — 604c
- Products (2) — 604d
- Adverse Events (5) — 604e
- Diagnoses (0) — 604f
- Timeline — 604g
- Assessments (1) — 604h
- Assessment Results (2) — 604i
- Expectedness (Local Datasheets) (0) — 604j
- Medical History & Concurrent Conditions (2) — 604k
- Drug History (0) — 604l
- Test Results (2) — 604m
- Narrative — 604n
- Linked Cases (0) — 604o
- Reference Numbers (0) — 604p
- Validation Results (Fail & Warning) (0) — 604q
- Translations (0) — 604r
- Submissions & Distributions (1) — 604s
- Action Items (0) — 604t
- Documents (1) — 604u
- Workflow Timeline — 604v
- Signatures (1) — 604w ▼ Submissions & Distributions  ⟵ 802     [Edit] ⚙▸

🔍 Show in Tab     1-8 of 8  ⚙▸

[+ Create]

| Name ▲ | Transmission Type | Lifecycle Status | Destination | File | Due Date |
|---|---|---|---|---|---|
| TR1 | TT1 | L1 | Dest1 | F1 | DD1 |
| TR2 | TT2 | L2 | Dest2 | F2 | DD2 |
| TR3 | TT3 | L3 | Dest3 | F3 | DD3 |
| TR4 | TT4 | L4 | Dest4 | F4 | DD4 |
| TR5 | TT5 | L5 | Dest5 | F5 | DD5 |
| TR6 | TT6 | L6 | Dest6 | F6 | DD6 |
| TR7 | TT7 | L7 | Dest7 | F7 | DD7 |
| TR8 | TT8 | L8 | Dest8 | F8 | DD8 |

▶ Action Items — 604s
▶ Documents — 604t
▶ Workflow Timeline — 604u
▶ Signatures — 604v
▶ System — 604w

1102  RULES

| 906 Name | 908 Order | 910 Regulation |
|---|---|---|
| 1102a — Downgrade Serious to Non-Serious | 10 | Reg1 |
| 1102b — Downgrade SUSAR to SAE | 20 | Reg2 |
| 1102c — Downgrade SUSAR to Non-Serious | 20 | Reg2 |
| 1102d — Serious | 30 | Reg1 |
| 1102e — SUSAR (Death) | 40 | Reg2 |
| 1102f — SUSAR (Life Threatening) | 40 | Reg2 |
| 1102g — SUSAR | 50 | Reg2 |
| 1102h — Non-Serious | 60 | Reg1 |

1104  RULE PARAMETERS (INPUTS)

| Report Type 1106 | Study Type 1108 | Serious 1110 | Fatal 1112 | Life Threatening 1114 |
|---|---|---|---|---|
| Spontaneous, Other, Study, Not Available | Other Studies, Individual Patient Use | No | | |
| Study | Clinical Trial | No | | |
| Study | Clinical Trial | Yes | | |
| Spontaneous, Other, Study, Not Available | Other Studies, Individual Patient Use | Yes | | |
| Study 1014, 1016 | Clinical Trial | Yes | Yes | |
| Study | Clinical Trial | Yes | | Yes |
| Study | Clinical Trial | Yes | | |
| Spontaneous, Other, Study, Not Available | Other Studies, Individual Patient Use | No | | |

Drug: DR2

Details ~ 1404
Registrations (3) ~ 1404a
Combination Products (0) ~ 1404b
Substances (0) ~ 1404c
Documents (0) ~ 1404d
Workflow Timeline ~ 1404e
System Information ~ 1404f Generic Name
International Birthdate
Manufacturer
Core Datasheet ▼ Registrations + Create      🔍 Show in Tab      1-3 of 3

| Registration Name ▲ | Country | Agency | Registration Type | Registration Number |
|---|---|---|---|---|
| DREG1 | C1 | Dest1 | RGT1 | RGN1 |
| DREG2 | C2 | Dest2 | RGT2 | RGN2 |
| DREG3 | C3 | Dest3 | RGT3 | RGN3 |

▲ Combination Products ~ 1404b
▲ Substances ~ 1404c
▲ Documents ~ 1404d

FIG. 14

Case: N3

Details — 1304
Contacts (2) — 1304a
Patient — 1304b
Products (3) — 1304c
Adverse Events (3) — 1304d
Assessments (6) — 1304e
Assessment Results (12) — 1304f
Causes of Death (2) — 1304g
Medical History & Concurrent Conditions (4) — 1304h
Drug History (2) — 1304i
Test Results (4) — 1304j
Narrative — 1304k
Linked Cases (0) — 1304l
Reference Numbers (0) — 1304m
Validation Results (Fail & Warnings) (0) — 1304n
Submissions & Distributions (3) — 1304o
Action Items (0) — 1304p
Documents (2) — 1304q
Workflow Timeline — 1304r
Signatures (0) — 1304s
System — 1304t ▼ Submissions & Distributions — 1304o 🔍 Show in Tab + Create

| Name ▲ | Transmission Type | Transmission Date | Reason | Origin | Destination | Status |
|---|---|---|---|---|---|---|
| TR1 | TT1 | TTD1 | RSS1 | Dest2 | Dest3 | Active |
| TR2 | TT2 | TTD2 | RSS2 | Dest4 | | Active |
| TR3 | TT3 | TTD3 | RSS3 | Dest4 | Dest1 | Active |

1-3 of 3

▶ Action Items — 1304p
▶ Documents — 1304q
▶ Workflow Timeline — 1304r
▶ Signatures — 1304s
▶ System — 1304t 1500
1502
1508  1510
✏ Edit

FIG. 15

Case: N3

- Details — 1304
- Contacts (2) — 1304a
- Patient — 1304b
- Products (3) — 1304c
- Adverse Events (3) — 1304d
- Assessments (6) — 1304e
- Assessment Results (12) — 1304f
- Causes of Death (2) — 1304g
- Medical History & Concurrent Conditions (4) — 1304h
- Drug History (2) — 1304i
- Test Results (4) — 1304j
- Narrative — 1304k
- Linked Cases (0) — 1304l
- Reference Numbers (0) — 1304m
- Validation Results (Fail & Warnings) (0) — 1304n
- Submissions & Distributions (4) — 1304o
- Action Items (0) — 1304p
- Documents (2) — 1304q
- Workflow Timeline — 1304r
- Signatures (0) — 1304s
- System — 1304t

1600

1508  1510

▼ Submissions & Distributions — 1602

+ Create

| Name ▲ | Transmission Type | Transmission Date | Reason | Origin | Destination | Status |
|---|---|---|---|---|---|---|
| TR1 | TT1 | TTD1 | RSS1 | Dest3 | Dest1 | Active |
| TR2 | TT2 | TTD2 | RSS2 | Dest4 | Dest2 | Active |
| TR3 | TT3 | TTD3 | RSS3 | Dest4 | Dest3 | Active |
| TR4 | TT4 | TTD4 | RSS4 | Dest5 | | Active |

Show in Tab          1-4 of 4

▶ Action Items — 1304p
▶ Documents — 1304q
▶ Workflow Timeline — 1304r
▶ Signatures — 1304s
▶ System — 1304t

FIG. 16

COMPUTING NETWORKS AND SYSTEMS FOR SUBMITTING DATA

CROSS-REFERENCE TO RELATED APPLICATIONS

This application claims priority to and is a continuation of U.S. patent application Ser. No. 17/230,752, filed Apr. 14, 2021, the disclosure of which is incorporated by reference in its entirety for all purposes.

TECHNICAL FIELD

The present disclosure relates to methods and systems for accessing, sharing, and submitting data using complex computing networks.

BACKGROUND

Researchers, scientists, industry players, academics, government regulators, and other stakeholders are increasingly in need of submitting data across a vast area of computer networks.

SUMMARY

According to one aspect of the subject matter described in this disclosure, method for submitting data in a computer network is provided. The method includes the following: receiving, using one or more computing device processors, a first request to process a first data at one or more data servers; determining, using the one or more computing device processors, whether the first data includes a plurality of first set of properties; generating, using the one or more computing device processors and the first set of properties, a second data having a plurality of second set of properties; storing, using the one or more computing device processors, the second data at the one or more data servers; providing, using the one or more computing device processors, at least one rule set for submitting second data to one or more external sources, wherein each of the at least one rule set comprises one or more rule parameters for submitting the second data; analyzing, using the one or more computing device processors, the second data to determine which one or more rules from the at least one rule set is applicable for submitting the second data to the one or more external sources; selecting, using the one or more computing device processors, one or more applicable rules from the at least one rule set based on the analysis of the second data; storing, using the one or more computing device processors, the one or more applicable rules in the one or more data servers; retrieving, using the one or more computing device processors, the second data from the one or more data servers; determining, using the one or more computing device processors, whether the second data includes update information for updating the second data; in response to the user entering update information for the second data, receiving, using the one or more computing device processors, the update information; in response to receiving the update information, updating, using the one or more computing device processors, the second data to include the update information; retrieving, using the one or more computing device processors, the one or more applicable rules from the one or more data servers; generating, using the one or more computing device processors, a plurality of third data by applying the one or more applicable rules to the second data, wherein the third data comprises a plurality of third set of properties; formatting, using the one or more computing device processors, the third data in accordance with the one or more applicable rules; initiating, using the one or more computing device processors, display of the third data and the third set of properties; identifying, using the one or more computing device processors and the third set of properties, the one or more external sources to distribute the third data; and sending, using the one or more computing device processors, the third data to the one or more external sources based on at least one of the third set of properties.

According to another aspect of the subject matter described in this disclosure, a system for submitting data in a computer network is provided. The system includes one or more computing device processors. One or more computing device memories are coupled to the one or more computing device processors. The one or more computing device memories store instructions executed by the one or more computing device processors, the instructions are configured to: receive a first request to process a first data at one or more data servers, wherein the one or more data servers store the first data; determine whether the first data includes a plurality of first set of properties; generate, using the first set of properties, a second data having a plurality of second set of properties; store the second data at the one or more data servers; provide a plurality of rule sets for submitting second data to one or more external sources, wherein each of the rule sets comprises one or more rule parameters for submitting the second data; analyze the second data to determine which of the rule sets is applicable for submitting the second data to the one or more external sources; select one or more applicable rules from the rule sets based on the analysis of the second data; store the one or more applicable rules in the one or more data servers; retrieve the second data from the one or more data servers; determine whether the second data includes the update information for updating the second data; in response to the user entering the update information for the second data, receive the update information; in response to receiving the update information, update the second data to include the update information; retrieve the one or more applicable rules from the one or more data cloud servers; generate a plurality of third data by applying the one or more applicable rules to the second data, wherein the third data comprises a plurality of third set of properties; format the third data in accordance with the one or more applicable rules; initiate display of the third data and the third set of properties; identify, using the third set of properties, the one or more external sources to distribute the third data; and send the third data to the one or more external sources.

According to another aspect of the subject matter described in this disclosure, a method for submitting data in a computer network is provided. The method includes the following: receiving, using one or more computing device processors, a first request to process a first data at one or more data cloud servers, wherein the one or more data cloud servers store the first data; determining, using the one or more computing device processors, whether the first data includes at least one of a plurality of first set of properties; generating, using the one or more computing device processors and the at least one of the first set of properties, a second data having at least one of a plurality of second set of properties; storing, using the one or more computing device processors, the second data at the one or more data cloud servers; providing, using the one or more computing device processors, a plurality of rule sets for submitting second data to one or more external sources, wherein each of the rule sets comprises one or more rule parameters for submitting the second data; analyzing, using the one or more computing device processors, the second data to determine which rule from the at least one rule set is applicable for submitting the second data to the one or more external sources; selecting, using the one or more computing device processors, one or more applicable rules from the rule sets based on the analysis of the second data; storing, using the one or more computing device processors, the one or more applicable rules in the one or more data cloud servers; retrieving, using the one or more computing device processors, the second data from the one or more data cloud servers; determining, using the one or more computing device processors, whether the second data includes update information for updating the second data; in response to the user entering the update information for the second data, receiving, using the one or more computing device processors, the update information; in response to receiving the update information, updating, using the one or more computing device processors, the second data to include the update information; retrieving, using the one or more computing device processors, the one or more applicable rules from the one or more data cloud servers; generating, using the one or more computing device processors, a plurality of third data by applying the one or more applicable rules to the second data, wherein the third data comprises a plurality of third set of properties; formatting, using the one or more computing device processors, the third data in accordance with the one or more applicable rules; initiating, using the one or more computing device processors, display of the third data and the third set of properties; identifying, using the one or more computing device processors and the third set of properties, the one or more external sources to distribute the third data; and sending, using the one or more computing device processors, the third data to the one or more external sources.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIG. 5 shows an example interface illustrating a detailed view of adverse event reports received by a data cloud server, according to one embodiment.

FIG. 8 shows an example interface illustrating what occurs when submission information has been re-evaluated, according to one embodiment.

FIG. 11 shows a table listing illustrating the rules of a rule set shown in FIG. 10, according to one embodiment.

FIG. 12 shows an example interface illustrating a detailed view of transmission profiles used to prepare submissions, according to one embodiment.

FIG. 14 shows an example interface illustrating a detailed view of drug information used to prepare submissions, according to one embodiment.

FIG. 15 shows an example interface illustrating the case where back reporting is not performed, according to one embodiment.

FIG. 16 shows an example interface illustrating the case where back reporting is performed, according to one embodiment.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

System Environment

Figure 1:
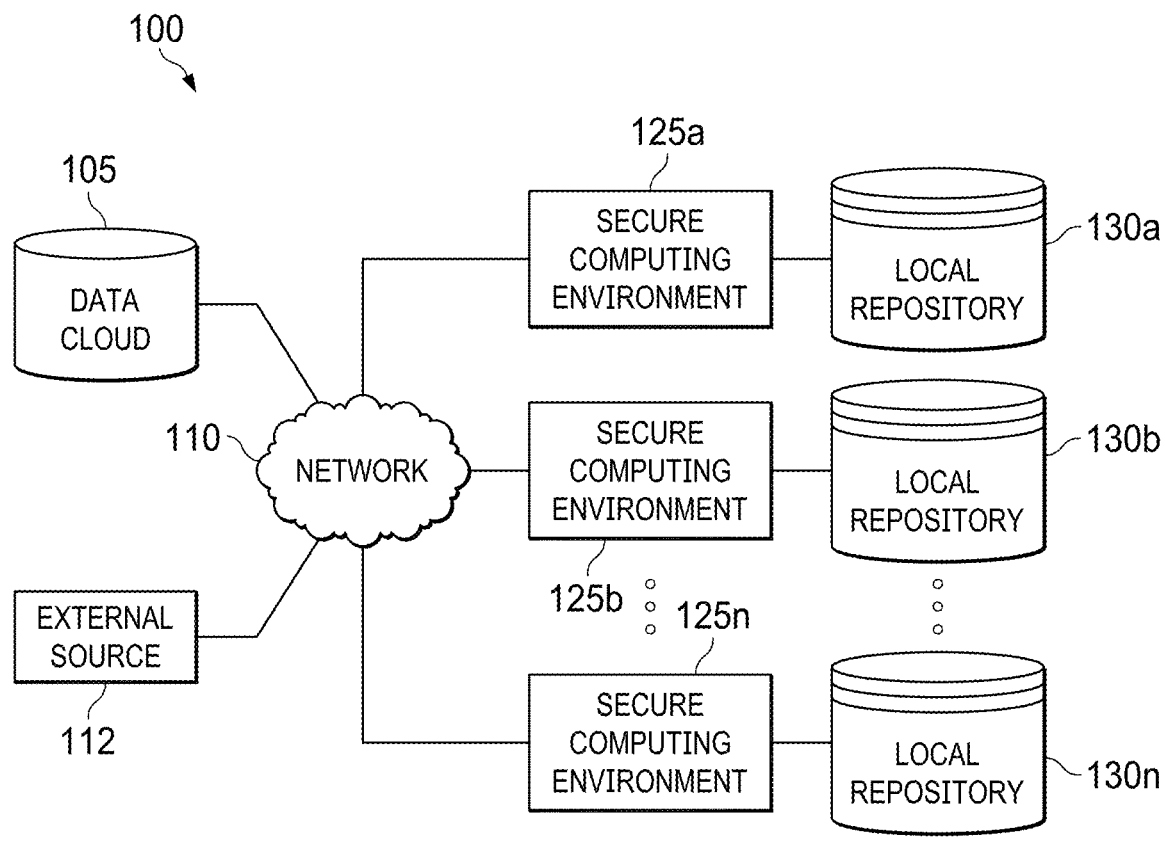
FIG. 1 is a high-level network system for accessing, managing, and sharing structured data, according to one embodiment.

Illustrated in FIG. 1 is a high level network system 100 for generating interfaces that access, maintain, analyze, and display structured data. In the depicted implementation, the system 100 may include a data cloud server 105 communicatively coupled to a plurality of secure computing environments 125 external sources 112 via the network 110. The secure computing environments 125 may in turn be communicatively coupled to a local repository 130. While a single data cloud server 105 is illustrated, the disclosed principles and techniques could be expanded to include multiple data cloud servers 105.

The data cloud server 105, according to some embodiments, is configured to store a plurality of structured data in a secure environment requiring authentication before access is granted to the structured data. According to one implementation, the structured data includes hierarchical data having varying and connected categories/levels that describe a plurality of aspects of the structured data. In some cases, the structured data in the data cloud server 105 is sourced or obtained from third-party scientific sources, and/or from third-party regulatory agencies, and/or from academic sources, and/or from industrial sources, etc.

In addition, the data cloud server 105 may be configured to manage or otherwise maintain the integrity and/or version updates of the structured data so that a user (e.g., a user of the secure computing environment) does not have to deal with such data maintenance processes as the structured data changes and/or grows. In one embodiment, the data cloud server 105 provides the most current version of the structured data to a user of the system. In other embodiments, the data cloud server 105 can also provide historical versions of the structured data when necessary or needed. Furthermore, the data cloud server 105 may include mechanisms that execute operations of data decompression operations, data decryption operations, and data decoding operations associated with the structured data so that the user is effectively isolated from such operations.

Moreover, the data cloud server 105 allows for easy associating, tagging, or coding of information for retrieval purposes. In some cases, the tagging or coding is automatically executed by the data cloud server 105. In addition, the data cloud server 105 allows a user (e.g., user of the secure computing environment 125) to transition from accessing structured data from the local repository 130 to the data cloud server 105.

The data cloud server 105 may be implemented within a computing device such as a mainframe server, a content server, a communication server, a laptop computer, a desktop computer, a handheld computing device, a virtual machine, a cloud-based computing solution and/or service, and/or the like. The data cloud server 105 may include a plurality of computing devices configured to communicate with one another and/or implement the techniques described herein. In some instances, the data cloud server 105 may include various elements of a computing environment as described with reference to FIGS. 2A and/or 2B. For example, the data cloud server 105 may include a processing system 202, a memory 204, an input/output (I/O) system 206, and a communication system 208. A user (e.g., database administrator) may operate/maintain the data cloud server 105 either locally or remotely as the case may require.

The data cloud server 105 may be configured to have storage logic that is executable to store structured data that is shared across multiple secure computing environments 125. According to one implementation, the data cloud server 105 may include a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the data cloud server 105 may include storage logic that is executable to store structured data derived from, for example, medical data, research data, education data, government data, etc. According to some implementations, the storage logic of the data cloud server 105 may be configured to automatically monitor and/or update relevant structured data obtained from a third-party source. For example, the storage logic of the data cloud server 105 may periodically monitor updates associated with structured data (e.g., dictionary of medical terms for research and regulatory purposes) from third-party organizations/sources and automatically update different versions of the structured data within one or more storage media of the data cloud server 105. In one embodiment, the storage logic of the data cloud server 105 manipulates or otherwise formats the structured data such that user interfaces generated by a secure computing environment 125 can seamlessly access/retrieve and present the structured data to a user. In addition, structured data from the data cloud server 105 may be accessed on a regulated basis via credential access, for example. This regulated basis may be determined, in part, by licenses, privileges, and other levels of authorization dictated by a user's credentials.

The external source 112 may operate similarly like the data cloud server 105 including having all the technical features of the data cloud server 105 described herein. The difference between the external source 112 and the data cloud server 105 is the external source 112 operates in providing information to the data cloud server 105 when requested. While a single external source 112 is illustrated, the disclosed principles and techniques could be expanded to include multiple external sources 112.

The local repository 130 may include storage logic for storing a local copy of structured data from the data cloud server 105. The local repository 130 may also be configured to store data other than the structured data. For example, the local repository 130 may store data from third-party sources and other data generated by the secure computing environment 125. The local repository may include a plurality of non-volatile/non-transitory storage media such as solid state storage media, hard disk storage media, virtual storage media, cloud-based storage drives, storage servers, and/or the like. According to some embodiments, the local repository 130 may include logic that updates structured data stored within its storage devices based on updates to structured data stored within the data cloud server 105. In some cases, snapshots of structured data may be accessed using the secure computing environment 125 so that updates associated with the snapshots may be effected on the local repository 130.

As previously discussed, the network 110 facilitates communication between the data cloud server 105, the external source 112, and the secure computing environment 125. The network 110 may also allow different secure computing environments 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The secure computing environment 125 is configured to generate one or more user interfaces for accessing, analyzing, and displaying the structured data. According to some implementations, the secure computing environment 125 includes functionalities and/or enhanced security features that allow a user to securely access and/or securely manage structured data. As shown more clearly in the exemplary functional and system diagrams of FIGS. 2A and 2B, the secure computing environment 125 includes a processing system 202, a memory 204, and I/O system 206, and a communication system 208. The processing system 202, the memory 204, the I/O system 206, and the communication system 208 may include one or more subsystems that perform one or more of the operations described herein. Additionally, each system of the secure computing environment 125 may be operatively and/or otherwise communicatively coupled with each other so as to facilitate one or more operations described herein. The secure computing environment 125 may include general hardware, specifically-purposed hardware, and/or a combination thereof.

Figure 2A:
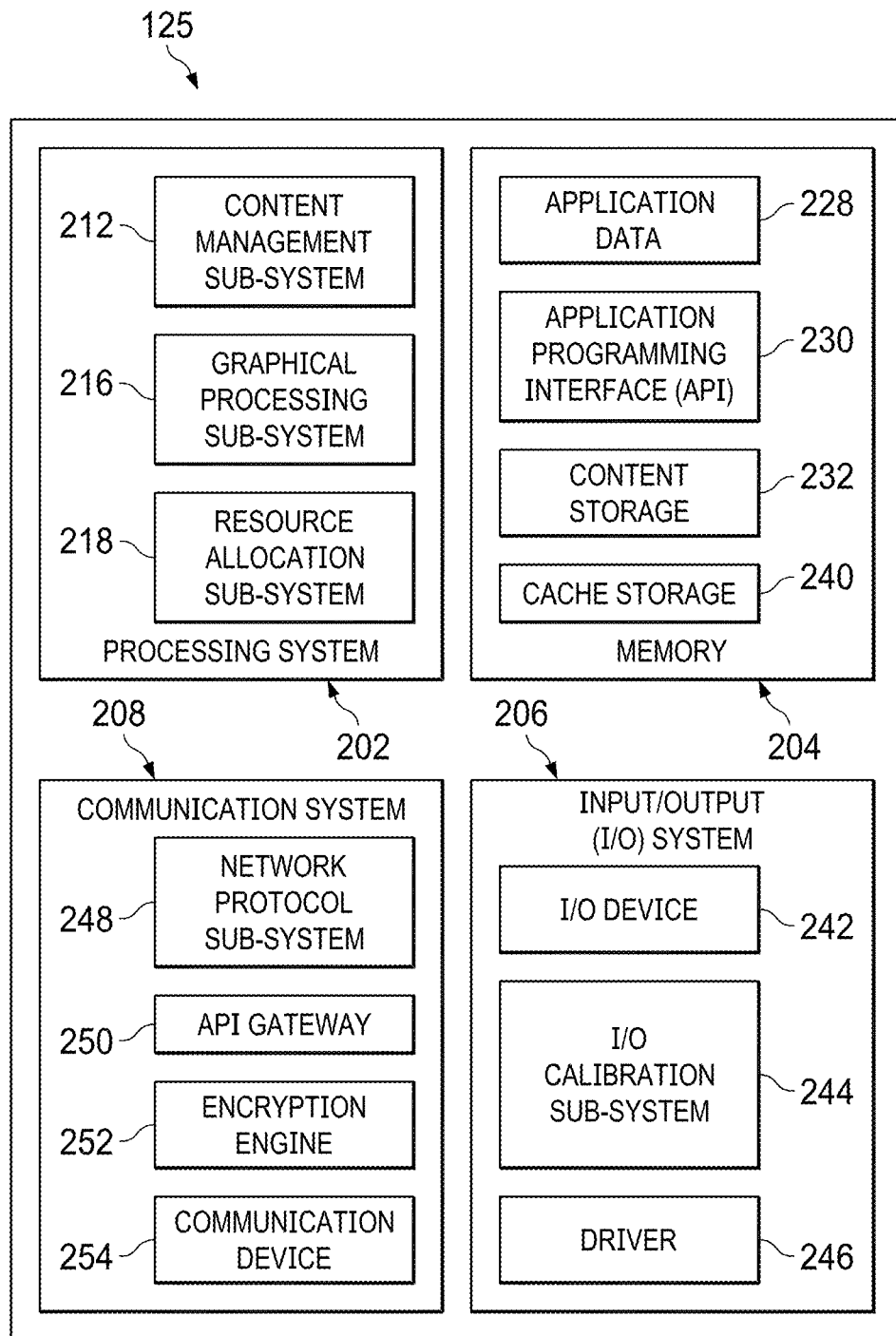
FIG. 2A is a functional block diagram of a computing environment for accessing and visualizing structured data, according to one embodiment.
Figure 2B:
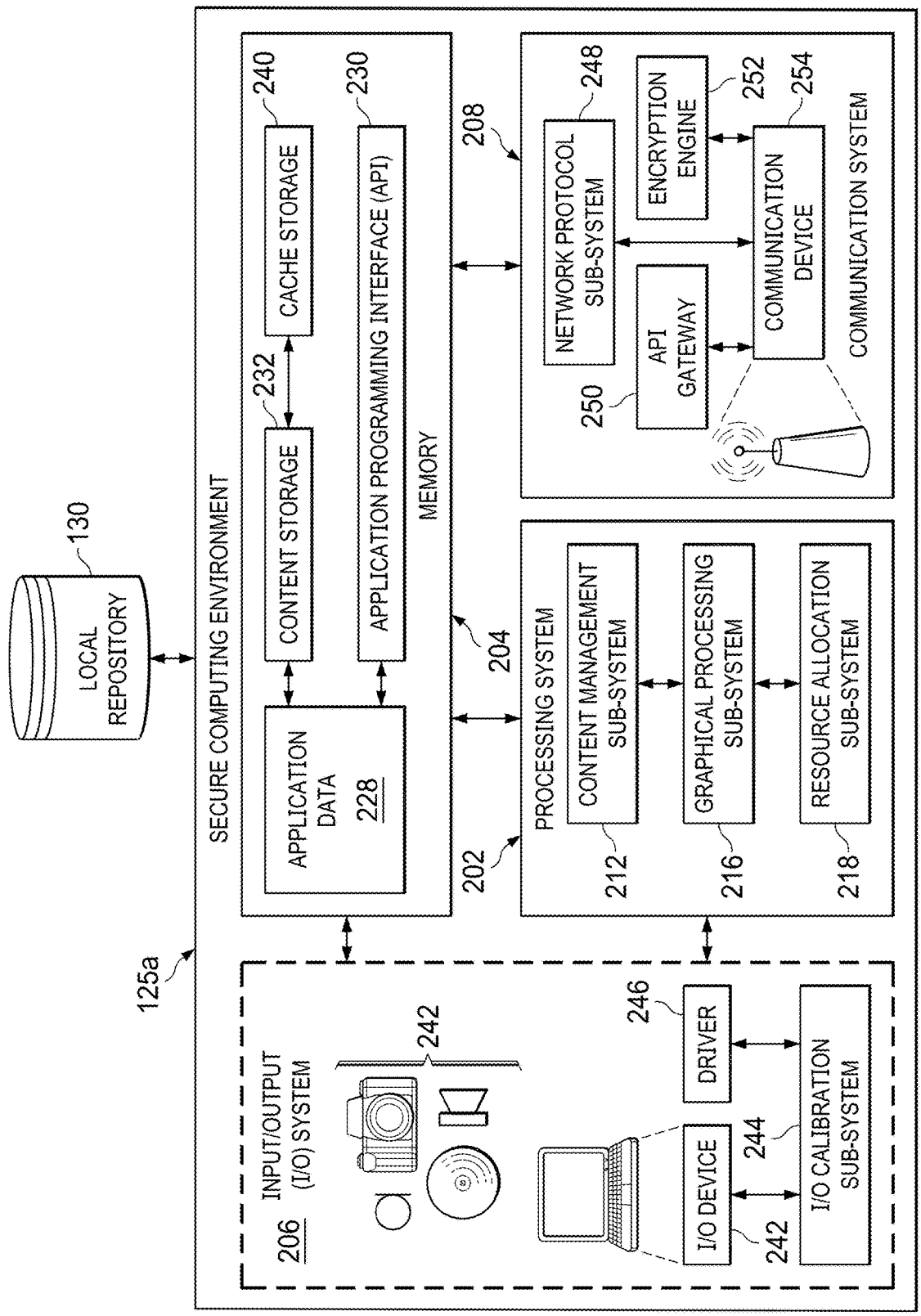
FIG. 2B is a detailed system diagram of FIG. 2A, according to one embodiment.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the secure computing environment 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the secure computing environment 125 and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, structured data content, user interfaces, or any combination thereof. In some instances, content on which the content management system 212 operates includes structured data from the data cloud server 105, structured data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the secure computing environment 125 and/or other computing environments. Computing resources of the secure computing environment 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the secure computing environment 125, as well as hardware for responding to the computing-resource needs of each system and/or subsystem. In some embodiments, the resource allocation subsystem 218 may use computing resources of a second secure computing environment separate and distinct from the secure computing environment 125 to facilitate a desired operation.

The memory 204 may be used for storing, recalling, receiving, transmitting, and/or accessing various files and/or data (e.g., structured data) during the operation of the secure computing environment 125. For example, the memory 204 may store, recall, and/or update structured data from the data cloud and/or the local repository as the case may be. In some embodiments, the memory 204 may store instructions and/or data that may be executed by the processing system 202. For instance, the memory 204 may store instructions that execute operations associated with one or more systems and/or one or more subsystems of the secure computing environment 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM)

device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of secure computing environment 125, an intended operating state of secure computing environment 125, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the secure computing environment 125. Secondary storage may comprise one or more disk drives and/or tape drives which may be used for non-volatile/non-transitory storage of data or as an over-flow data storage device of the secure computing environment 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the secure computing environment 125 and/or any other computing environments described herein. As such, application data 228 may store any information and/or data associated with an application. Application data 228 may further store various pieces of information and/or data associated with the operation of an application and/or with the secure computing environment 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of secure computing environment 125 and/or any other computing environment described herein. For example, secure computing environment 125 may include one or more APIs for various devices, applications, systems, subsystems, elements, and/or other computing environments to allow communication between one or more applications associated with the secure computing environment 125. Accordingly, API 230 may include API databases containing information that may be accessed and/or used by applications, systems, subsystems, elements, and/or operating systems of other devices and/or computing environments in communication with the secure computing environment 125. In some cases, the API 230 may enable the data cloud server 105 and the secure computing environment 125 to communicate with each other.

The content storage 232 may facilitate deployment, storage, access, and/or utilization of information associated with structured data as further discussed below. In one embodiment, content storage 232 may communicate with a content management system 212 to receive and/or transmit content (e.g., structured data, media content, etc.).

The I/O system 206 may include hardware and/or software elements for the secure computing environment 125 to receive, and/or transmit, and/or present information useful for generating one or more interfaces for retrieving and displaying structured data according to some embodiments of this disclosure. For example, elements of the I/O system 206 may be used to receive input from a user of the secure computing environment 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with secure computing environment 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing structured data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of secure computing environment 125 (or an element of another computing environment) may recognize and/or integrate with I/O device 242.

The communication system 208 may facilitate establishment, maintenance, monitoring, and/or termination of communications between the secure computing environment 125 and other computing environments, third-party server systems, and/or the like. Communication system 208 may also facilitate internal communications between various elements (e.g., systems and/or subsystems) of secure computing environment 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the secure computing environment 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the secure computing environment 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of structured data.

The application programming interface (API) gateway 250 may allow other devices and/or computing environments and/or applications external to the secure computing environment 125 to access the API 230 of the memory 204. For example, a computing system may access the API 230 of the secure computing environment 125 via the API gateway 250. In some embodiments, API gateway 250 may be required to validate user credentials associated with a user of a computing device (e.g., a device external to the secure computing environment 125) prior to providing access to the API 230 to the user. API gateway 250 may include instructions for the secure computing environment 125 and thereby communicate with external devices and/or between components of the secure computing environment 125.

The encryption engine 252 may facilitate translation, encryption, encoding, decryption, and/or decoding of information received, transmitted, and/or stored by the secure computing environment 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for secure computing environment 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

User Interfaces

In performing the operations shown in FIGS. 3-16, the example interfaces described herein may communicate with data cloud server 105 to access information either from the data cloud server 105 or the external source 112. The example interfaces described herein may be implemented on the secure computing environment 125 or alternatively on even a separate server/computer system coupled to network 110. Moreover, the example user interfaces described herein may utilize the communication resources of the secure computing environment 125 described herein to communicate with data cloud server 105. In addition, example user interfaces described in FIGS. 3-16 may utilize the communication resources of the separate server/computer system to communicate with data cloud server 105.

External source 112 may send a number of adverse event reports (AERs) to data cloud server 105 via network 110. The data cloud server 105 may use the AERs to devise new cases. The data cloud server 105 may evaluate which of the cases may require submissions and distribution to the different secure compute environments 125. In particular, the data cloud server 105 may include a number of rule sets defining the format of a submission as well as which of the secure compute environments 125 may receive the submission. Rule sets may be defined by a number of rules that are based on a number of parameters.

Figure 3:
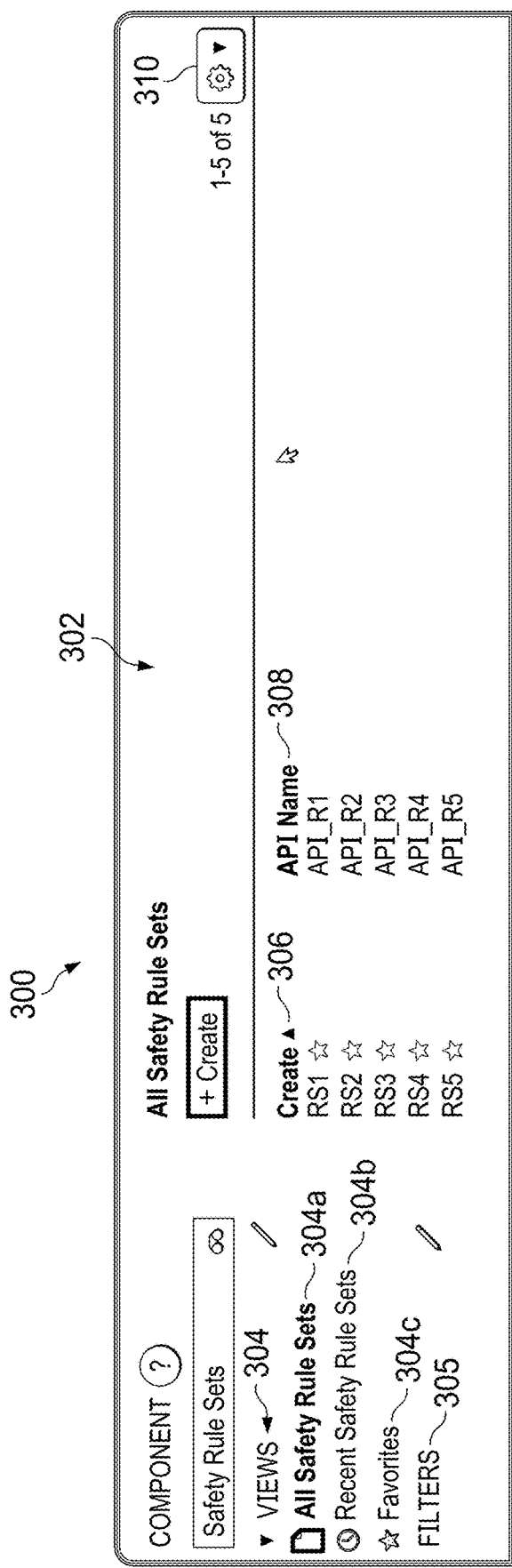
FIG. 3 shows an example interface listing of rule sets stored in a data cloud server, according to one embodiment.

FIG. 3 shows an example interface 300 listing of rule sets stored in data cloud server 105, according to one embodiment. The example interface 300 may provide a listing, via table entry 302, of the rule sets RS1-RS6 stored in data cloud server 105. The rule sets RS1-RS6 may be used by data cloud server 105 to produce submission reports that are sent to one or more of the secure compute environments 125. Typically the submission reports are produced when the information of a case may be applied to one or more of the rule sets. This may lead to the generation of one or more submission reports. Also, each of the secure compute environments 125 may have different criteria for receiving submission reports. Also, the format of the submission reports may be different depending the on the information received.

The create button 306 may be provided to allow for the creation of new rules. In some implementations, a user coupled to network 110 may send to data cloud server 105 new rules. The table listing 302 may include an API Name field 308 that lists in a column API Names API_R1-API_R5. Each rule set RS1-RS5 may correspond to an API Name API_R1-API_R5. The API Names API_R1-API_R5 may be used by data cloud server 105 to access a specific rule set RS1-RS5 in its memory during processing.

The example interface 300 may include a view button 304 providing following viewing options 304a-304c for viewing rule sets RS1-RS5: All Safety Rule Sets 304a; Recent Safety Rule Sets 304b; and Favorite 304c. The viewing option 304a may allow viewing of all the rule sets RS1-RS5 stored by data cloud server 105. The view option 304b may allow viewing of recent rule sets RS1-RS5 used or created by data cloud server 105. The view option 304c may allow viewing of rule sets RS1-RS5 identified as favorites by data cloud server 105. Moreover, example interface 300 may include filters 305 for filtering rule sets RS1-RS5 for viewing in table listing 302. The filters 305 may provide a number of properties for filtering rule sets RS1-RS5 for viewing in table listing 302.

Also, example interface 300 may include an edit button 310 for editing one or more of the rule sets RS1-RS2. In some implementations, the edit button may include the functionality for debugging and testing the performance of a specific rule set RS1-RS5.

Figure 4:
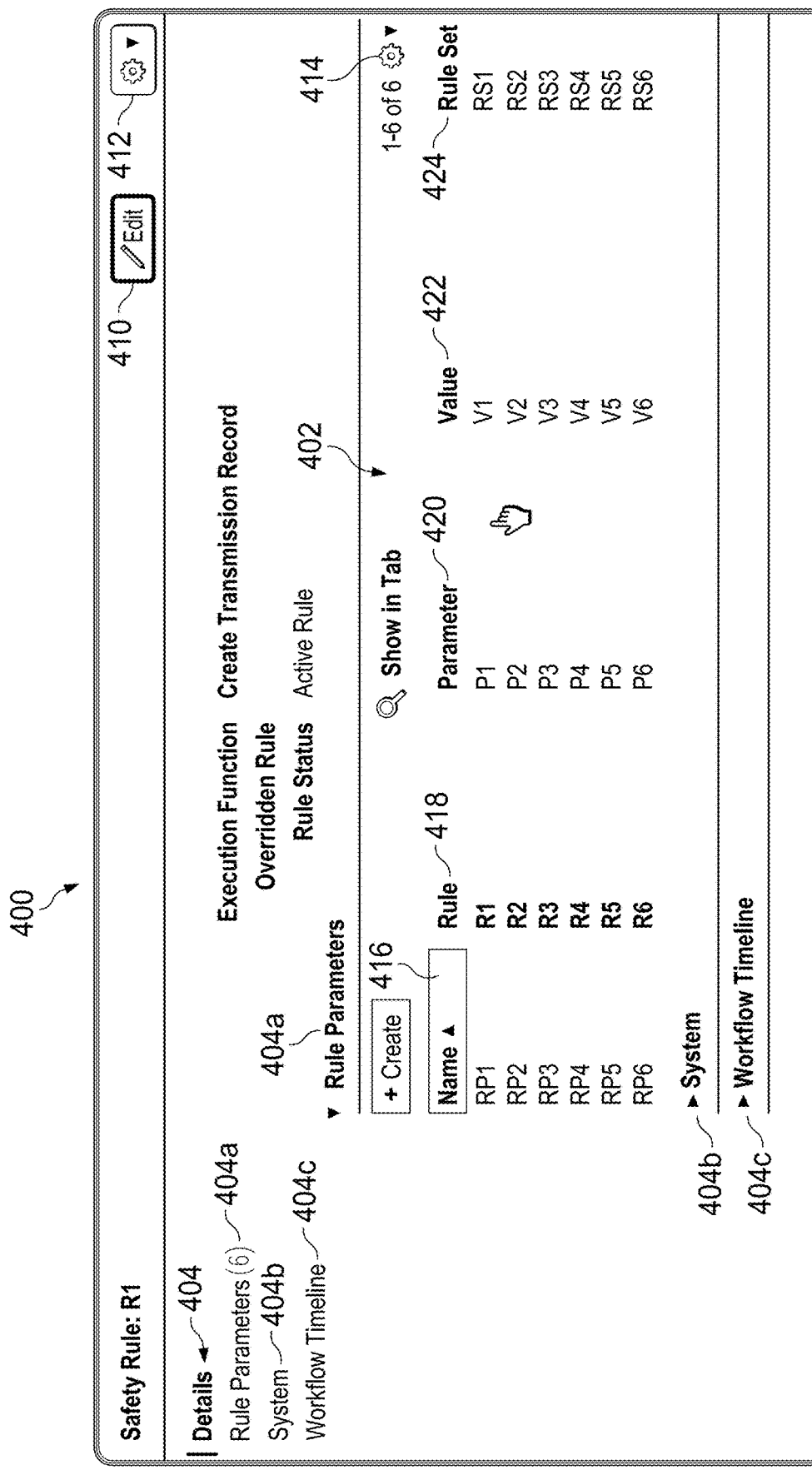
FIG. 4 shows an example interface listing all rule parameters used to define a rule, according to one embodiment.

FIG. 4 shows an example interface 400 listing all rule parameters used to define a rule, according to one embodiment. Example interface 400 may include detailed information of a rule as shown by table listing 402. The leftmost region 403 of example interface 400 includes a Details panel 404 having fields 404a-404c. The region 405 of example interface 400 also includes fields 404a-404c, but here the user may click a drop-down menu providing more detailed information for each field 404a-404c. Also, when a user clicks one of the fields 404a-404c in the leftmost region 403, the user may be directed to the specific clicked field 404a-404c in region 405 to access the clicked field's detailed information.

Fields 404a-404c may include the following fields: Rule parameters 404a; System 404b; and Workflow Timeline 404c.

The table listing 402 may show the following information for each of rule R1's rule parameters: Rule Parameter Name RP1-RP6; Rule R1; Parameter P1-P6; Value V1-V6; and Rule Set RS1-RS6. In particular, the table listing 402 shows rule R1 having a number of parameters P1-P6 with the following rule parameter names RP1-RP6. When the rule R1 is applied to a case having one or more of the parameters P1-P6, one or more of the values V1-V6 are added to the submission report. Note the rule set RS1-RS5 may share the same rule R1 but different values may be assigned depending on the rule set RS1-RS6 used and parameters P1-P6 that may be found in a case. Values V1-V6 may define where the submission report is eventually distributed and the format the submission report may be presented in.

The edit button 410 may allow a user to update information for fields 404a-404c while button 412 may allow a user to preview submissions with the updated information.

FIG. 5 shows an example interface 500 illustrating a detailed view of adverse event reports received by data cloud server 105, according to one embodiment. The example interface 500 may include listing portion 502 that shows detailed information of adverse event reports received by data cloud server 104. Note adverse event reports may be received in an Inbox format, where one or more adverse event reports are sent by external source 112. In particular, table listing 502 lists in columns the following content information fields for each adverse event report Inbox: Name AER1-AER6; Lifecycle state L1-L6; Due Date DD1-DD6; Receipt Date RD1-RD6; New Info Date NID1-NID6; Report Type RT1-RT6; Study ST1-ST6; Product P1-P6, Event E1-E6; and Seriousness SR1-SR6. These fields may be inputted using other means, such as a separate window for input by the user, or are automatically generated/populated by data cloud server 105. The Lifecycle state L1-L6 may be based on several predefined state information, which the data cloud server 105 may automatically update when a case's Lifecycle state has changed.

The example interface 500 may provide a view panel 504 and a filter panel 506. The view panel 504 may include the following additional options: All Inbox field 504a, Recent Inbox 504b; and Favorites field 504c. When either of the fields 504a-504c is clicked by the user, a select number of cases are displayed in table listing 502. For example, All Inbox field 504a may allow the user to view all the adverse events as stored in data cloud server 105. While the Recent Inbox field 504b may allow a user to view recently viewed Inbox. The Favorites field 504c may allow a user to view their more actively viewed Inboxes in table listing 502.

Filter panel 506 may include several fields 506a-506h used to filter the number of cases shown in table listing 502. Filter panel 506 may include the following fields:

Due Date field 506a
Receipt Date field 506b
New Info Date field 506c
Report Type field 506d
Study field 506e
Product 506f
Seriousness field 506g
Relatedness field 506h Note the fields 506a-506h may correspond to specific fields in table listing 502. Filter panel 506 may allow a user to click one or more of the fields 506a-506h to define one or more filtering parameters. A filtering operation is performed using the one or more filtering parameters where a select number of adverse event report may be presented in table listing 502. Also, the example interface 500 may include the edit button 508 that allows for editing the information of an adverse event report. In some implementations, a drop down menu may be provided listing which information in an adverse event report can be changed.

Figure 6:
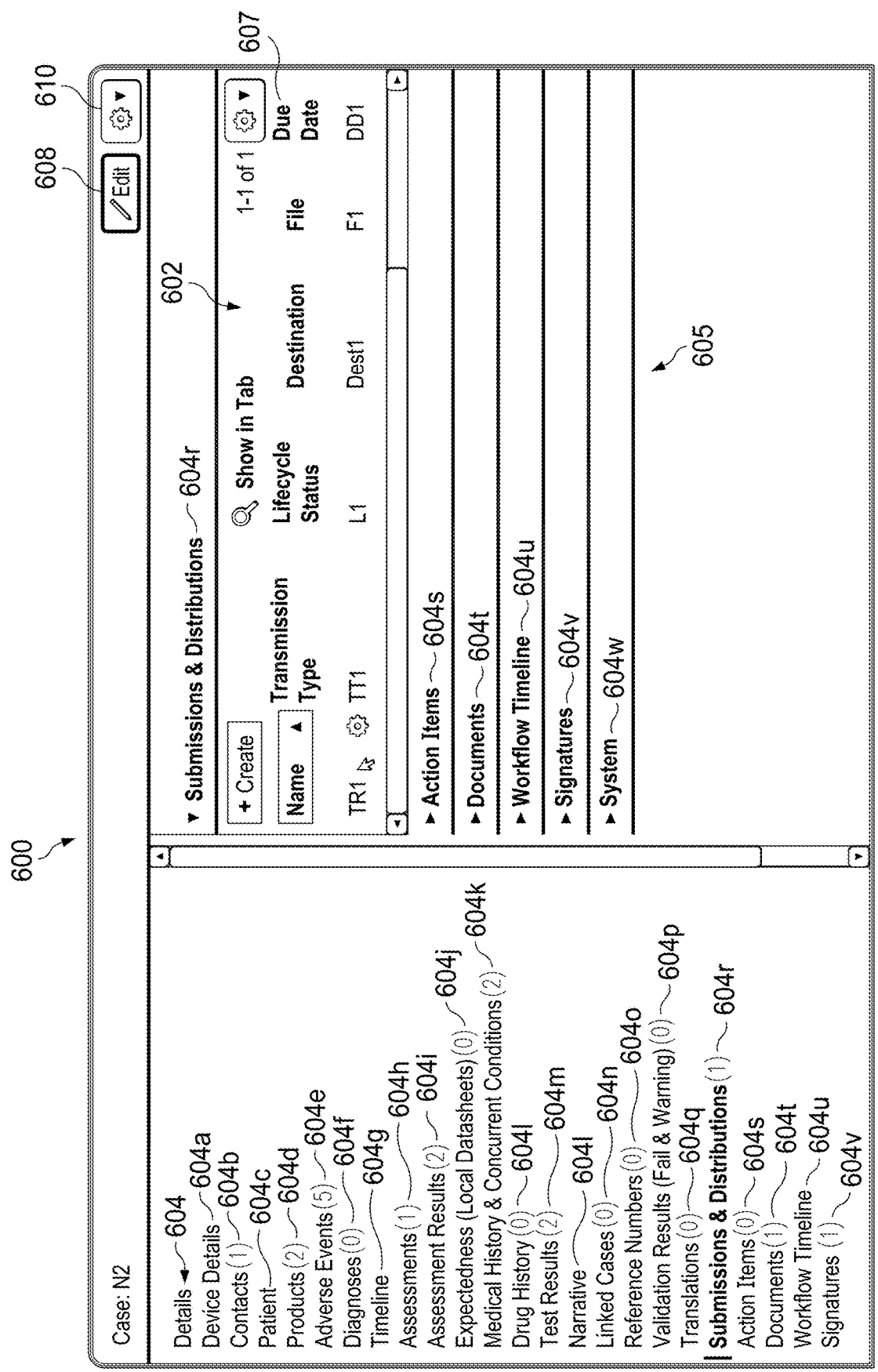
FIG. 6 shows an example interface illustrating a detailed view of a case, according to one embodiment.

FIG. 6 shows an example interface 600 illustrating a detailed view of a case, according to one embodiment. The example interface 600 may provide the user more detailed information regarding the case N2 as produced by the data cloud server 105 using one or more adverse event reports as shown in example interface 500. The example interface 600 may include listing portion 602 that shows detailed information of case N2. The example interface 600 may include a Details panel 604 having fields 604a-604v. Note the Detail panel 604 may not show all the fields 604a-604w together, but the user may scroll down to see the other remaining field 604w.

The region 605 of listing portion 602 may also include fields 604a-604v, but here the user may click a drop-down menu providing more detailed information for each field. Note for purposes of clarity only fields 604s-604w are shown, but all fields may be displayed by scrolling up or down. Also, when a user clicks one of the fields 604a-604t of Detail panel 604, the user may be directed to the specific clicked field 604a-604t in region 605 to access the clicked field's detailed information. The region 605 may not show all the fields 604a-604w together, but the user may scroll up or down to see the other remaining field 604a-604r.

Fields 604a-604w may include the following fields: Device Details 604a; Contact 604b; Patient 604c; Products 604d; Adverse Events 604e; Diagnoses 604f; Timeline 604g; Assessments 604h; Assessment Results 604i; Expectedness 604j; Medical History and Concurrent Conditions 604k; Drug History 604l; Test Results 604m; Linked Cases 604n; Reference Numbers 604o; Validation Results 604p; Translation 604q; Submissions and Distributions 604r; Action Items 604s; Documents 604t; Workflow Timelines 604u; Signatures 604v; and System 604w.

The region 607 of listing portion 602 may list in columns the following content information fields for the Submissions and Distributions field 604r: Name TR1, Transmission Type TT1, Lifecycle Status L1, Destination Dest1, File F1, and Due Date DD1. The Name field TR1 may identify the name of a submission/distribution. The Transmission Type field TT1 may define the format of the submission. The Lifecycle status field L1 may define the current lifecycle stage of the submission. In some implementations, the data cloud server 105 may update the Lifecycle Status field L1 when there is a change. The Destination field Dest1 may define the destination for sending the submission after generation. The file field F1 may define the location or name of a file that stores the submissions. The due date field DD1 may define the due date for sending the submission to its corresponding destination.

The edit button 608 may allow a user to update information shown in listing portion 602 while button 610 may allow a user to preview various submission reports or update information needed for generating a submission.

Figure 7:
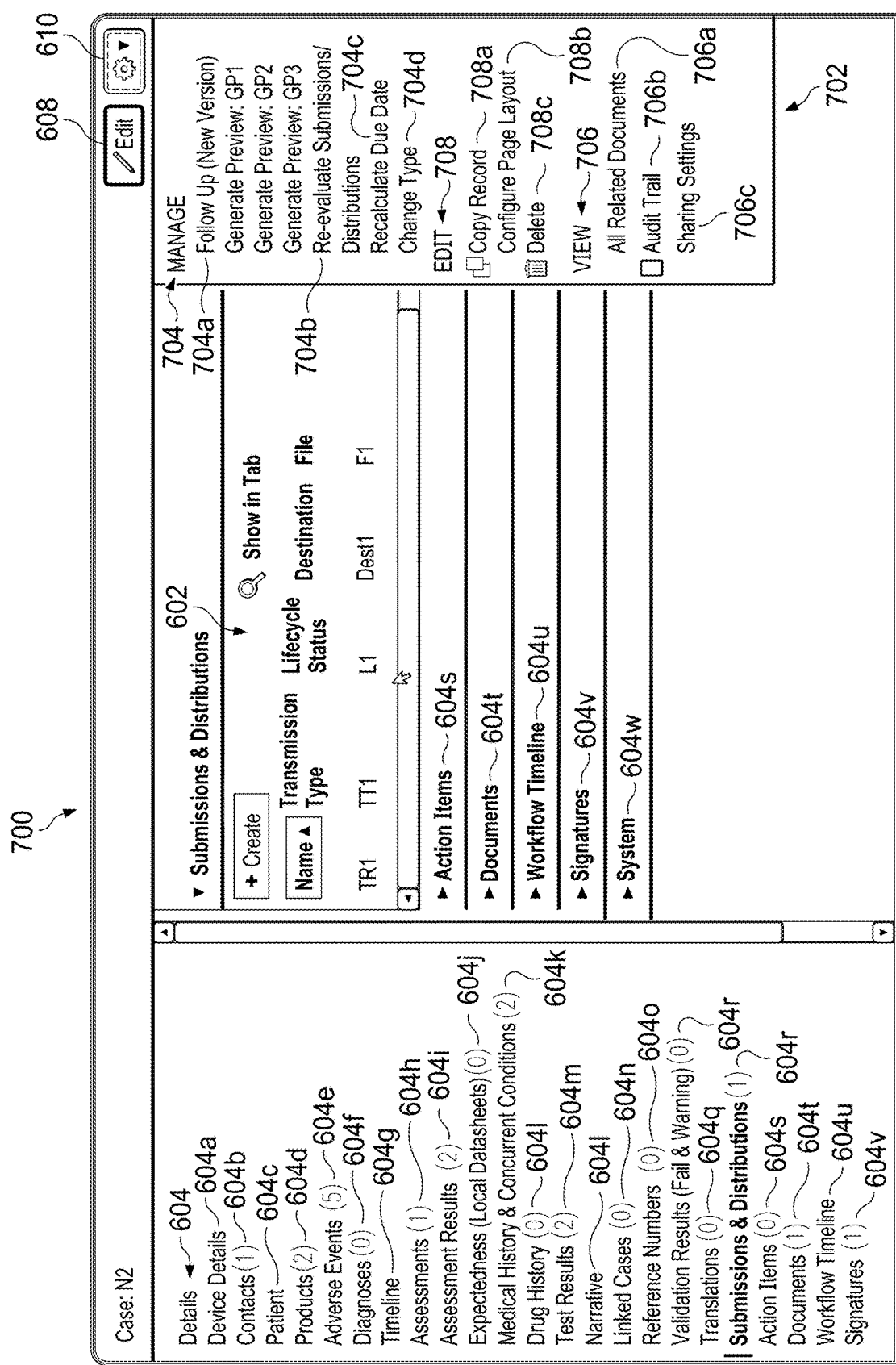
FIG. 7 shows an example interface for editing and reviewing information of a submitted case, according to one embodiment.

FIG. 7 shows an example interface 700 for editing and reviewing information of a submitted case, according to one embodiment. The example interface 700 is similar to example interface 600. The key difference is example interface 700 may allow a user to edit and view detailed information of a submission. When a user clicks the button 610 a drop down menu 702 is presented that may include the following command options: Manage 704, View 706, and Edit 708. The manage command option 1106 may provide a user a number of manage sub-options 704a-704d and general preview sub-options GP1-GP3 for managing the information and producing a new version of a submission. The manage sub-option 704a may allow to follow up a new version of submission based on additional information. The manage command option 704 may include a number of preview sub-options GP1-GP3 for previewing a submission in different formats. The re-evaluate submissions/distribution sub-option 1106b may allow the user to re-evaluate a submission after new information has been provided leading to additional submissions possibly being produced. The recalculate due date sub-option 1106d may permit the user to change the due date of a submission for a case.

The view command option 706 may provide a user a number of editing sub-options 706a-706c for editing the submitted case. The view sub-option 706a may allow the user to view all documents related to the submitted case. The view sub-option 706b may provide the user with an audit trail of the submitted case for purposes of tracking and maintenance. The view sub-option 706c may allow the user the capabilities to share the submitted case to third parties. In some implementation, a separate user interface may be provided for the user to enter sharing information.

The edit command option 708 may provide a user a number of editing sub-options 708a-708c for editing the submitted case. The edit sub-option 708a may allow the user to make a copy of the case information, as shown in FIG. 7, and add it to a new case or store it for later use. The edit sub-option 708b may allow the user to configure the page layout example interface 700 to their preference. The edit sub-option 708c may allow the user to delete the current submitted case from the data cloud server 105.

FIG. 8 shows an example interface 800 illustrating what occurs when submission information has been re-evaluated, according to one embodiment. The table listing 802 of example interface 800 is similar to table listing 602 of example interface 700. The difference between table listing 802 and table listing 602 is the table listing 802 include more submissions TR1-TR8 then table listing 602 that only has one submission TR1. This occurs because additional information has been updated in data cloud server 105 for Case N2. Afterwards, either the user or data cloud server 105 may activate the Re-evaluate Submissions/Distribution field 704c, as described in FIG. 7, to re-evaluate the additional information of Case N2 by applying the rules of rule sets RS1-RS5 of example interface 300. In this case, additional submissions with Names TR2-TR8 were produced as a result of the additional information. Moreover, the additional submissions TR2-TR8 include the following fields in table listing 802: Transmission Type TT2-TT8 Lifecycle Status L2-L8, Destination Dest2-Dest8, File F2-F8, and Due Date DD2-DD8.

Figure 9:
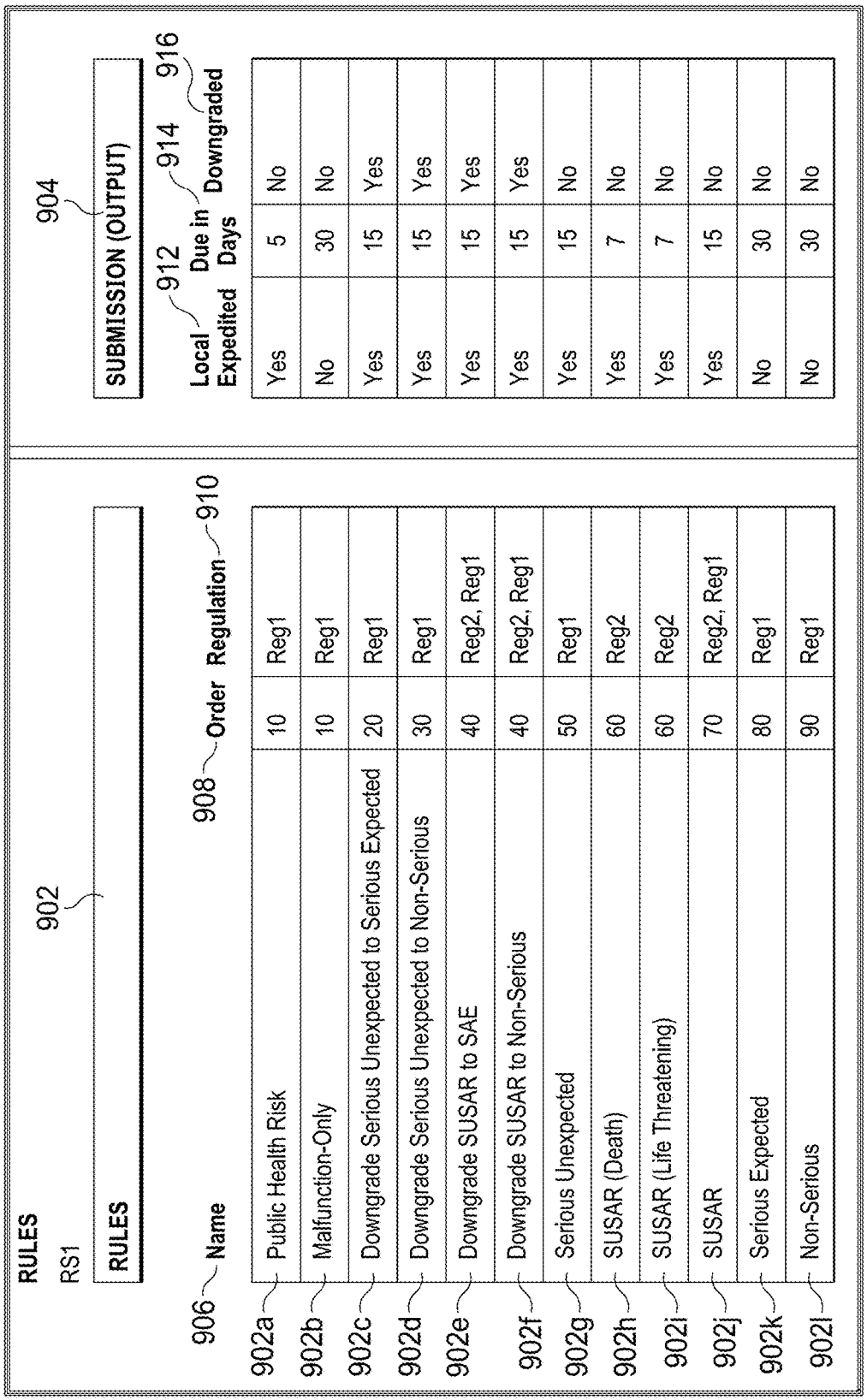
FIG. 9 shows a table listing illustrating several rules of a rule set, according to one embodiment.

FIG. 9 shows a table listing 900 illustrating several rules 902 of a rule set RS1, according to one embodiment. The rules set RS1 may include several specific rules 902a-902l as indicated by rules header 902 for devising submissions. In particular, table listing 900 may list in columns the following content information fields for each of the rules 902a-902l: Name field 906; Order field 908; Regulation 910; Local Expedited 912; Due in Days 914; and Downgraded 916.

The Name field 906 may indicate the names of each of the rules 902a-902l. In this case, each of the rules 902a-902l has a specific name related to a specific submission. The order field 908 may indicate a value for the importance of each rule relative to the others. The lower the value of the order field the higher the importance that the submission occur timely. In some implementations, the higher the value of the order field 908 the higher the importance that the submission occur timely. The Regulation field 910 may list one or more regulations for which each rule was based on for preparing a submission. In this case, each rule 902a-902l may have a Regulation field 910 that includes regulations Reg1 or Reg2. The regulations Reg1 and Reg2 may be a legal requirement or contractual requirement defining the specific details of the submission. This may include the format for submission, due date requirements, destination, whether a submission is locally expedited, or the like.

The Local Expedited field 912, Due in Days field 914, and Downgraded field 916 may be defined under a Submission (Output) header 904. The Submission (Output) header 904 may define for each rule 902a-902l information the submission must include prior to transmission. For example, the rule 902a may require a submission for public health risk to indicate it is being locally expedited having a due date of 5 days for transmission, and the submission does not indicate downgrade in the status. In this case, the submission may include a local expedited field indicating a yes, a Due in Days field of 5 days, and a Downgrade field 916 of No. Once a submission is properly created, the data cloud server 105 or user may view or assess the local expedited field, due in days field, and downgraded field of the submission to properly prepare the submission in a timely fashion for transmission.

The Local Expedited field 912 may include a yes or no value indicating whether local expedited transmission processes are initiated or not. When the Local Expedited field 912 is marked yes, the data cloud server 105 may assess whether the submission is correctly indicating it is being locally expedited in accordance with regulations, and transmit the submission on or before the date specified in Due in Days field 914.

The Downgraded field 912 may be associated with the situation where a submission was previously transmitted for an event of higher significance but later was deemed to have a lower significance. The rules 902c-902f may be associated with rules for downgrading a submission. For example, the rule 902c may downgrade a serious unexpected event to a serious expected event. When the Downgrade field 912 is marked yes, the data cloud server 105 may assess whether the submission is properly indicating it is downgrading a previously sent submission in accordance with regulations, and transmit the submission on or before the date specified in Due in Days field 914 by data cloud server 105. Depending on the regulation, data cloud server 105 may initiate different transmission processes for downgrading a submission. For example, the data cloud server may need to send two separate submissions for downgrading a submission instead of one.

Figure 10:
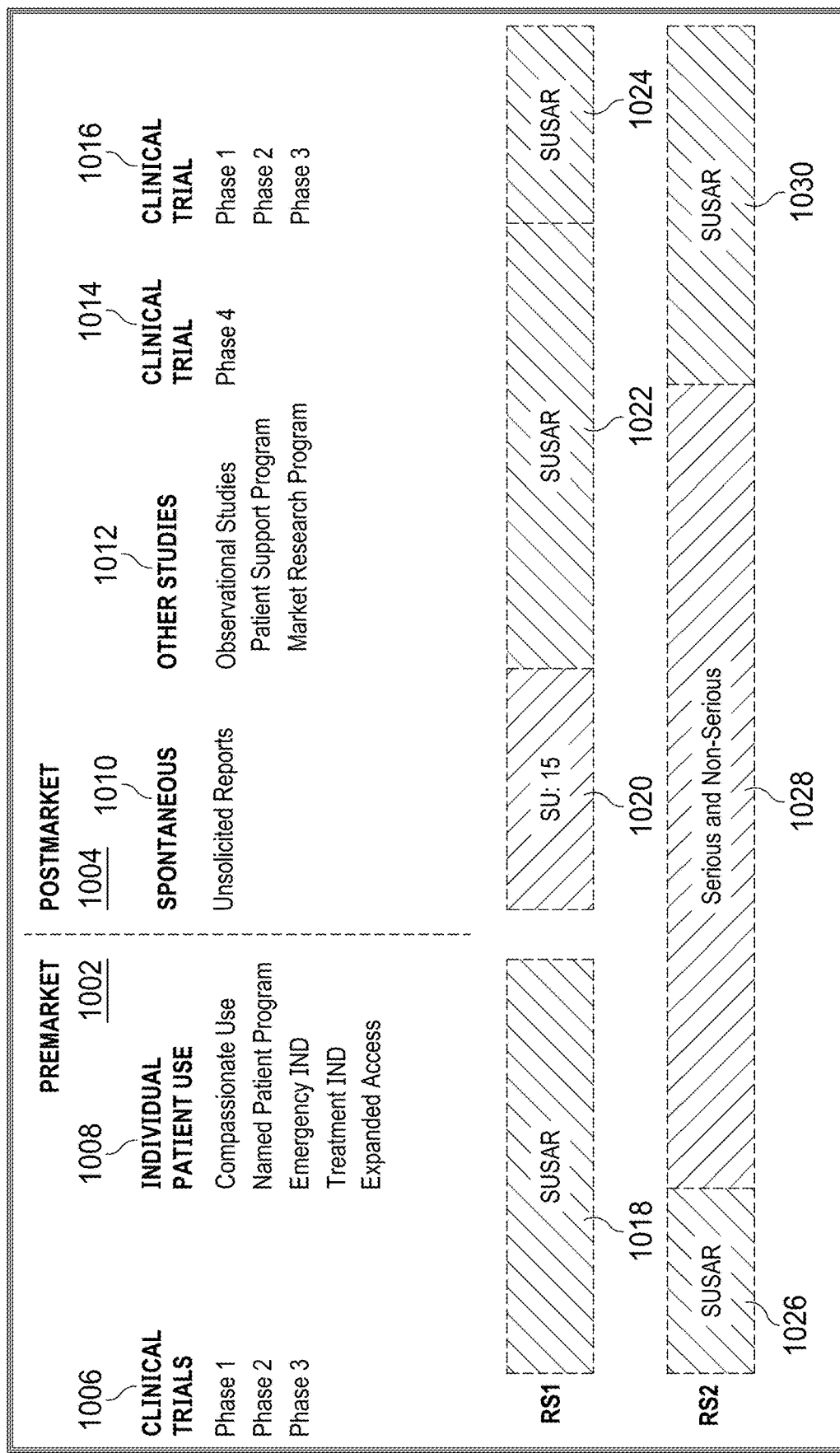
FIG. 10 shows the applicability of the rules in premarket and postmarket studies, according to one embodiment.

FIG. 10 shows the applicability of the rules in premarket 1002 and postmarket 1004 studies, according to one embodiment. Premarket events 1002 may include clinical trials 1006 and individual patient use studies 1008. The premarket clinical trials 1006 may include interventional clinical trials having a number of phases Phase1-Phase3. The individual patient use studies 1008 may involve patients having life threatening conditions making them ineligible for clinical trials. Examples of individual patient use studies 1008 may include the following: Compassionate Use programs; Name Patient Program; Individual Emergency; Individual Treatment; and Expanded Access.

Postmarket events may include spontaneous reports 1110, other studies 1012, a first clinical trial 1014, and second clinical trials 1016. The spontaneous reports 1010 may be unsolicited adverse event reports typically received by data cloud server 105. Note spontaneous reports 1010 may be assigned a Report Type (RT) of "Spontaneous" in the received adverse event report. The other studies 1012 may include observational studies from patient support programs or market research programs. Also, the other studies 1012 may be assigned a Study Type (ST) of "Other studies." The first postmarket clinical trial 1014 may include a phase 4 postmarket clinical trial. The second postmarket clinical trials 1016 may include a Phase1-Phase3 postmarket interventional clinical trials. Note the first postmarket clinical trial 1014 and the second postmarket clinical trials 1016 may each be assigned a Study Type (ST) of "Clinical Trial" and a Report Type (RT) of "Study."

When receiving an adverse event report, data cloud server 105 may determine whether the adverse event report is associated with a premarket 1002 or postmarket 1004 event based on information from the adverse event report or case information. Once it is determined the adverse event report is associated with premarket event 1002 or postmarket 1004 event, data cloud server 05 may indicate this determination in the submission if it is required.

Rule sets RS1 and RS2 are provided to show when certain rules may apply. In this case, Suspected Unexpected Serious Adverse Reaction (SUSAR), Serious, Serious Unexpected (SU), and Non-serious submission rules are analyzed with reference to premarket event 1002 and postmarket event 1004.

The rule set RS1 may include a SUSAR submission rule 1018 that is only applicable during premarket clinical trials 1006 and individual patient use studies 1008. The SU submission rule 1020 for rule set RS1 is only applicable for postmarket spontaneous reports 1010. The rule set RS1 may include a SUSAR submission rule 1022 that is only applicable during other studies 1012 and the first postmarket clinical trial 1014. In addition, the rule set RS1 may include a SUSAR submission rule 1024 that is applicable during the second postmarket clinical trial 1016.

The rule set RS2 may include a SUSAR submission rule 1026 that is only applicable during premarket clinical trials 1006. Also, the rule set RS2 may include a serious and non-serious submission rules 1028 that is applicable to individual patient use studies, postmarket spontaneous reports, and other studies. The submission rules 1028 may cover both premarket and postmarket events. The rule set RS2 may include a SUSAR submission rule 1030 that is applicable during the first postmarket clinical trial 1014 and the second postmarket clinical trials 1016.

FIG. 11 shows a table listing 1100 illustrating the rules 1102a-1102h of the rule set RS2 of FIG. 10, according to one embodiment. The SUSAR submission rule 1026 of rule set RS2 of FIG. 10 is similar to rule 1102f, and the SUSAR submission rule 1030 is similar to rule 1102g. The table listing 1100 may include Rules header 1102 and Rule parameters header 1104. The Rules header 1102 may be similar to Rules header 902 including the same fields 906-910. The Rule parameters header 1104 may include the following column fields: Report Type 1106; Study Type 1108; Serious 1110; Fatal 1112; and Life Threatening 1114. Each rule 1102a-1102h may include fields 1104-1114.

Also, each field 1104-1114 may define specific input parameters a case or adverse event report may include for a submission rule to apply. In this case, rule 1102f may be a SUSAR submission rule at least requiring the report type field (RT) in an adverse report to be "Study" and the corresponding study type field (ST) to be "Clinical Trial." The same may apply for rule 1102g. The key difference between rule 1102f and rule 1102g is the Life Threatening field 1114 of rule 1102f includes a "Yes" value. The Life Threatening field 1114 of rule 1102g includes a "Null" value equating to a No value. This may indicate rule 1102f may apply to premarket clinical trials 1006 while rule 1102g may apply to first postmarket clinical trial 1014 or second postmarket clinical trials 1016.

Rules 1102d and 1102h may be similar to the serious and non-serious submission rules 1028. Both rules may at least require the report type field (RT) in an adverse report to be of "Spontaneous" and the corresponding study type field (ST) to be "Other Studies" or "Individual Patient Use." As shown in FIG. 10, this may indicate rules 1102d or 1102h may be applicable in premarket individual patient use studies 1008 or postmarket spontaneous reports or other studies 1012.

Once a submission has been created using rules 1102a-1102h, the submission may include the information in fields 1106-1114 including whether the submission may involve a premarket event or postmarket event.

Figure 12:
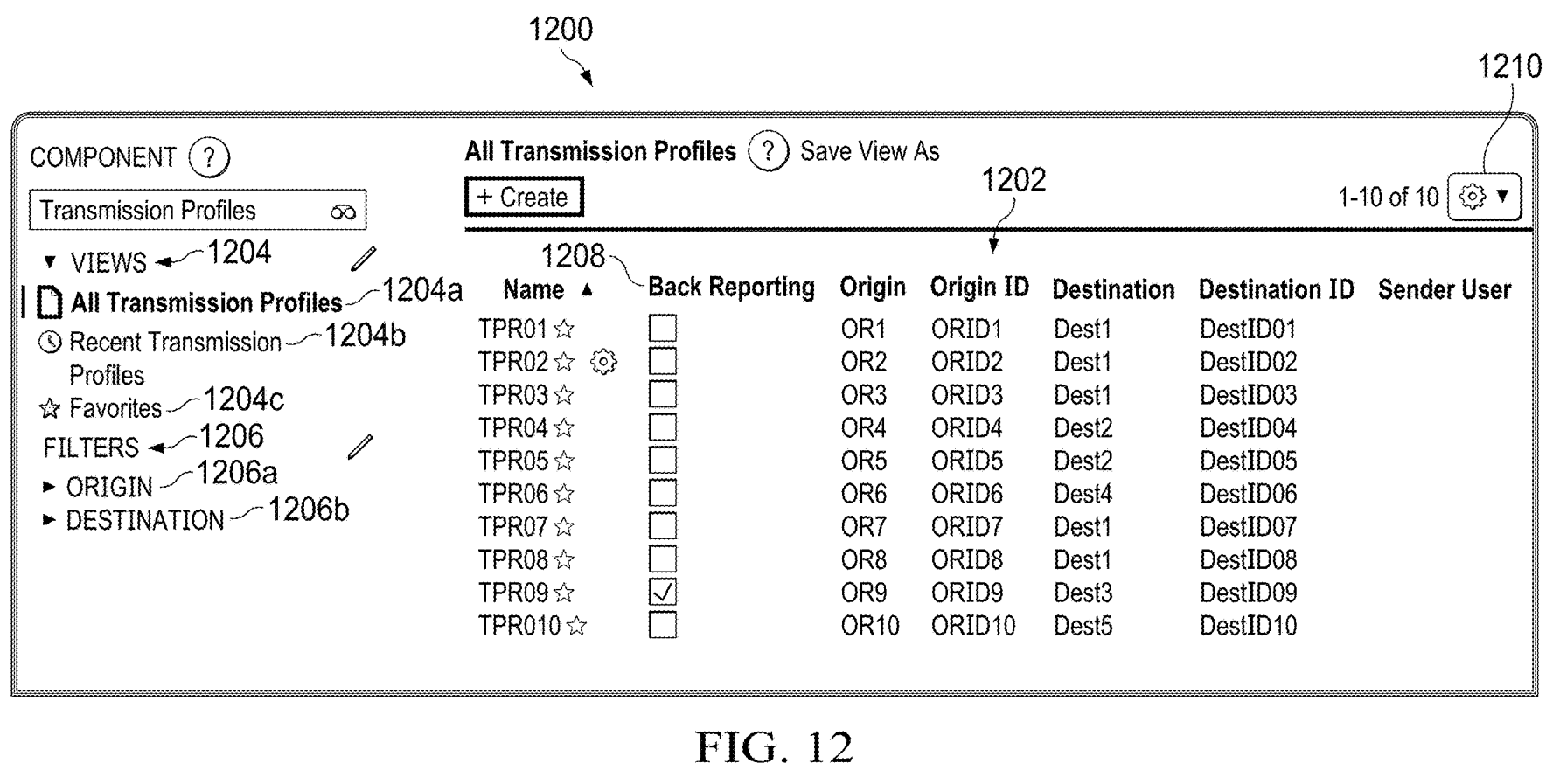

FIG. 12 shows an example interface 1200 illustrating a detailed view of transmission profiles used by data cloud server 105 to prepare submissions, according to one embodiment. The example interface 1200 may include listing portion 1202 that shows detailed information of transmission profile by data cloud server 104. Note transmission profiles may be used by the data cloud server 104 to prepare and format submissions to be sent to one or more secure compute environments 125. In particular, table listing 1202 may list in columns the following content information fields for each transmission profile: Transmission Profile Name TPRO1-TPRO10; Origin OR1-OR10; Origin ID ORID1-ORID10; Destination Dest1-Dest5; Destination ID DestID1-DestID10; Report Type RT1-RT6; Study ST1-ST6; Product P1-P6, Event E1-E6; and Seriousness SR1-SR6. Also, table listing 102 may also list in a column a back reporting field 1208 for each transmission profile. The back reporting field 1208 may indicate whether one or more adverse reports or cases that originated from one or more of the Destinations Dest1-Dest5 require a submission to be sent to these one or more corresponding Destinations Dest1-Dest5. Certain Destinations Dest1-Dest5 may require a back reported submission and others do not. If a Destination Dest1-Dest5 does require a back reported submission, its corresponding back reporting field 1208 may be acknowledged by clicking its corresponding check box. Note all of the content information fields for the transmission profile described herein may be inputted using other means, such as a separate window for input by the user, or are automatically generated/populated by data cloud server 105.

The example interface 1200 may provide a view panel 1204 and a filter panel 1206. The view panel 1204 may include the following additional options: All Transmission Profiles 1204a, Recent Transmission Profiles 1204b; and Favorites field 1204c. When either of the fields 1204a-1204c is clicked by the user, a select number of transmission profiles are displayed in table listing 502. For example, All Transmission Profiles 1204a may allow the user to view all the transmission profiles as stored in data cloud server 105. While the Recent Transmission Profiles 1204b may allow a user to view recently viewed transmission profiles. The Favorites field 1204c may allow a user to view their more actively viewed transmission profiles in table listing 1202.

Filter panel 1206 may include several fields 1206a-1206b used to filter the number of transmission profile shown in table listing 1202. Filter panel 1206 may include the following fields: Origin field 1206a and Destination field 1206b.

Note the fields 1206a-1206b may correspond to specific fields in table listing 502. Filter panel 1206 may allow a user to click one or more of the fields 1206a-1206b to define one or more filtering parameters. A filtering operation is performed using the one or more filtering parameters where a select number of transmission profiles may be presented in table listing 1202. Also, the example interface 1200 may include the edit button 1210 that allows for editing the information of an adverse event report. In some implementations, a drop down menu may be provided listing which information in an adverse event report can be changed.

Figure 13:
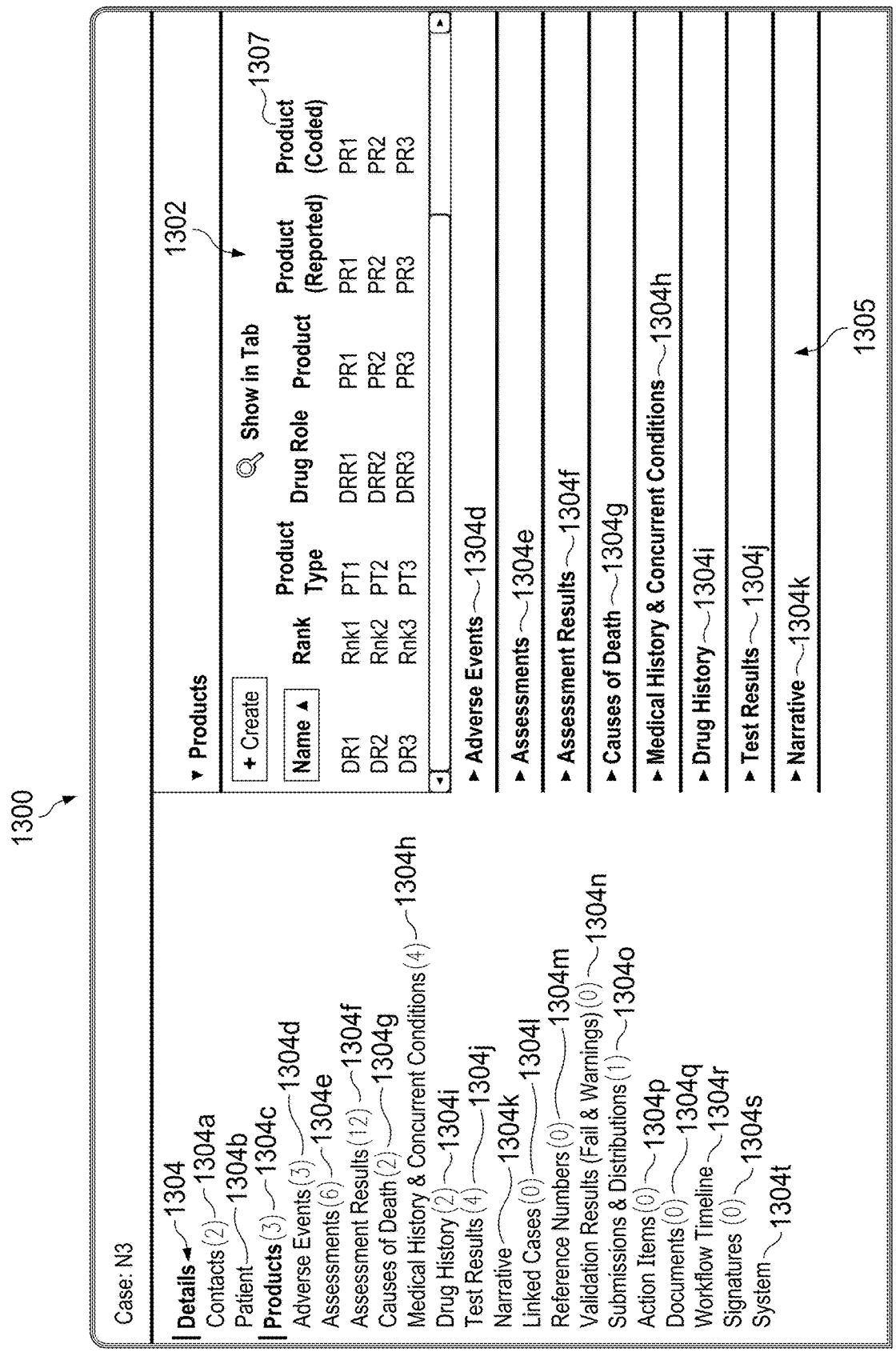
FIG. 13 shows an example interface illustrating a detailed view of product information, according to one embodiment.

FIG. 13 shows an example interface 1300 illustrating a detailed view of product information used for submission, according to one embodiment. The example interface 1300 may provide the user more detailed information regarding the case N3 as produced by the data cloud server 105 using one or more adverse event reports as shown in example interface 500. The example interface 1300 may include listing portion 1302 that shows detailed information of case N3. The example interface 1300 may include a Details panel 1304 having fields 1304a-1304t. Note the Detail panel 1304 may not show all the fields together, but the user may scroll down to see the other remaining field as needed.

The region 1305 of listing portion 1302 may also include fields 1304a-1304t, but here the user may click a drop-down menu providing more detailed information for each field. Note for purposes of clarity only fields 1304d-1304l are shown, but all fields may be displayed by scrolling up or down. Also, when a user clicks one of the fields 1304a-1304t of Detail panel 1304, the user may be directed to the specific clicked field 1304a-1304t in region 1305 to access the clicked field's detailed information. The region 1305 may not show all the fields 1304a-1304t together, but the user may scroll up or down to see the other remaining fields.

Fields 1304a-1304t may include the following fields: Contact 1304a; Patient 1304b; Products 1304c; Adverse Events 1304d; Assessments 1304e; Assessment Results 1304f; Causes of Death 1304g; Medical History and Concurrent Conditions 1304h; Drug History 1304i; Test Results 1304j; Narrative 1304k; Linked Cases 1304l; Reference Numbers 1304m; Validation Results 1304n; Submissions and Distributions 1304o; Action Items 1304p; Documents 1304q; Workflow Timelines 1304r; Signatures 1304s; and System 1304t.

The region 1307 of listing portion 1302 may list in columns the following content information fields for the Products field 1304c: Drug Name DR1-DR3, Rank Rnk1-Rnk3, Product Type PT1-PT3, Drug Role DRR1-DRR3, Product PR1-PR3, Product (Reported) PR1-PR3, and Product (Coded) PR1-PR3. The Drug Name fields DR1-DR3 may identify the names of the drugs used in a product. The Product Type fields PT1-PT3 may define the product type. The Drug Role fields DRR1-DRR3 may define the role of each drug used in a product. The Product fields, Product (Reported) fields, and Product (Coded) fields may all be associated with the products PR1-PR3 for purposes of discussion.

When a user clicks on say Drugs DR1-DR3, a different example interface may be presented illustrating details of Drug DR2, which will be describe hereinafter.

FIG. 14 shows an example interface 1400 illustrating a detailed view of drug information used to prepare submissions, according to one embodiment. The example interface 1400 may provide the user more detailed information regarding drug DR2 after clicking the drug DR2 in example interface 1300. The example interface 1400 may include listing portion 1402 that shows detailed information of Drug DR2. The example interface 1400 may include a Details panel 1404 having fields 1404a-1404f. Note the Detail panel 1404 may not show all the fields together, but the user may scroll down to see the other remaining field as needed.

The region 1405 of listing portion 1402 may also include fields 1404a-1404f, but here the user may click a drop-down menu providing more detailed information for each field. Note for purposes of clarity only fields 1404b-1404d are shown, but all fields may be displayed by scrolling up or down. Also, when a user clicks one of the fields 1404a-1404f of Detail panel 1404, the user may be directed to the specific clicked field 1404a-1404f in region 1405 to access the clicked field's detailed information. The region 1405 may not show all the fields 1404a-1404f together, but the user may scroll up or down to see the other remaining fields.

Fields 1404a-1404d may include the following fields for Drug DR2: Registrations 1404a; Combination Products 1404b; Substances 1404c; Documents 1404d; Workflow Timeline 1404e; and System Information 1404f.

The region 1407 of listing portion 1402 may list in columns the following content information fields for the Registration field 1404a: Registration Name DREG1-DREG3, Country C1-C3, Agency Dest1-Dest3, Registration Type RGT1-RGT2, and Registration Number RGN1-RGN3. The Registration Name fields DREG1-DREG3 may identify the various registration names of Drug DR2. The Country fields C1-C3 may define the country associated with the registration names. The Agency fields Dest1-Dest3 may define a destination associated with the external source 112 for sending an adverse report for a drug having the following registration names DREG1-DREG3. The Registration Type fields RGT1-RGT2 and Registration Number fields RGN1-RGN3 may correspond to the registration types and registration numbers associated with registration names DREG1-DREG3 for drug DR2.

FIG. 15 shows an example interface 1500 illustrating the case where back reporting is not performed, according to one embodiment. The example interface 1500 is similar to example interface 1300. The difference between example interface 1500 and example interface 1300 is the example interface 1500 includes details of Submission and Distribution field 1304o. A listing portion 1502 may show the details of Submission and Distribution field 1304o.

Region 1507 of listing portion 1502 may list in columns the following content information fields for the Submission and Distribution field 1304o: Transmission Name TR1-TR3, Transmission Type TT1-TT3, Transmission Date TTD1-TTD3, Reason RSS1-RSS3, Origin Dest2 and Dest4, and Destination Dest3 and Dest1. The Transmission Name fields TR1-TR3 may be associated with the names of transmissions received or produced by the system. The Transmission Type fields TT1-TT3 may identify whether a transmission is an inbound transmission sent from an external source 112 associated with an adverse report or the like or a submission to be sent to secure compute environment 125. In this case, the transmission report TR1 may include may be an inbound transmission. The Transmission Date fields TTD1-TTD2 may indicate the date transmission reports TR1-TR3 were generated. The Reason fields RSS1-RSS3 may indicate the reasons for generating transmission reports TR1-TR3.

The Origin fields Dest2 and Dest3 may also indicate a destination where the information underlying the transmission report originated from. Note the Origin fields may include destinations associated with the Destinations fields Dest1-Dest5 of example interface 1200. In this case, transmission report TR1 originated from Destination Dest2. The Destination fields Dest3 and Dest1 may indicate the destination where a particular submission is to be sent. In this case, transmission reports TR2 and TR3 are the only submissions generated having Destinations Dest3 and Dest4, respectively. The transmission report TR1 does not have a corresponding Destination field indicated because it is not a submission for the reasons stated above. The Status field may show whether transmission reports TR1-TR3 are active or inactive.

Based on the Origin field of transmission report TR1, data cloud server 105 may determine whether a back report is generated and sent to external source 112 that originated the adverse event report producing case N3. In this case, the location of the external source 112 is Dest2. Typically back reporting is not necessary, however, under certain circumstances, it is. The example interface 1200 includes the back reporting field 1208 for each transmission profile TPRO1-TPRO10 indicating whether a corresponding external source 112 having locations Dest1-Dest5 requires generating a back report. In this case, the example interface 1200 shows neither of the transmission profiles having a Destination field Dest2, associated with the location of an external source 112, requires back reporting, as indicated by the corresponding back reporting fields 1208 not being checked or marked.

The edit button 1508 may allow a user to update information shown in listing portion 1502 while button 1510 may allow a user to preview various transmission reports or update information needed for generating a transmission report.

FIG. 16 shows an example interface 1600 illustrating the case where back reporting is performed, according to one embodiment. The example interface 1600 is similar to example interface 1500. The difference is listing portion 1602 of example interface 1600 shows transmission report TR1 having its corresponding Origin field changed from Dest2 to Dest3. Due to this change, the data cloud sever 105 generated a back report TR4, which is a submission report to be sent to an external source 112 at location Dest3. The exact location where the adverse even report producing case N3 originated. In this case, example interface 1200 shows a transmission profile TPRO9 having a Destination field Dest3, associated with the location of an external source 112, requires back reporting, as indicated by the corresponding back reporting fields 1208 being checked or marked. The data cloud server 105 may utilize the information in the transmission profiles TPRO1-TPRO10 to determine whether a back report is generated based on the Origin fields shown in example interfaces 1500 and 1600.

Workflow

Figure 17A:
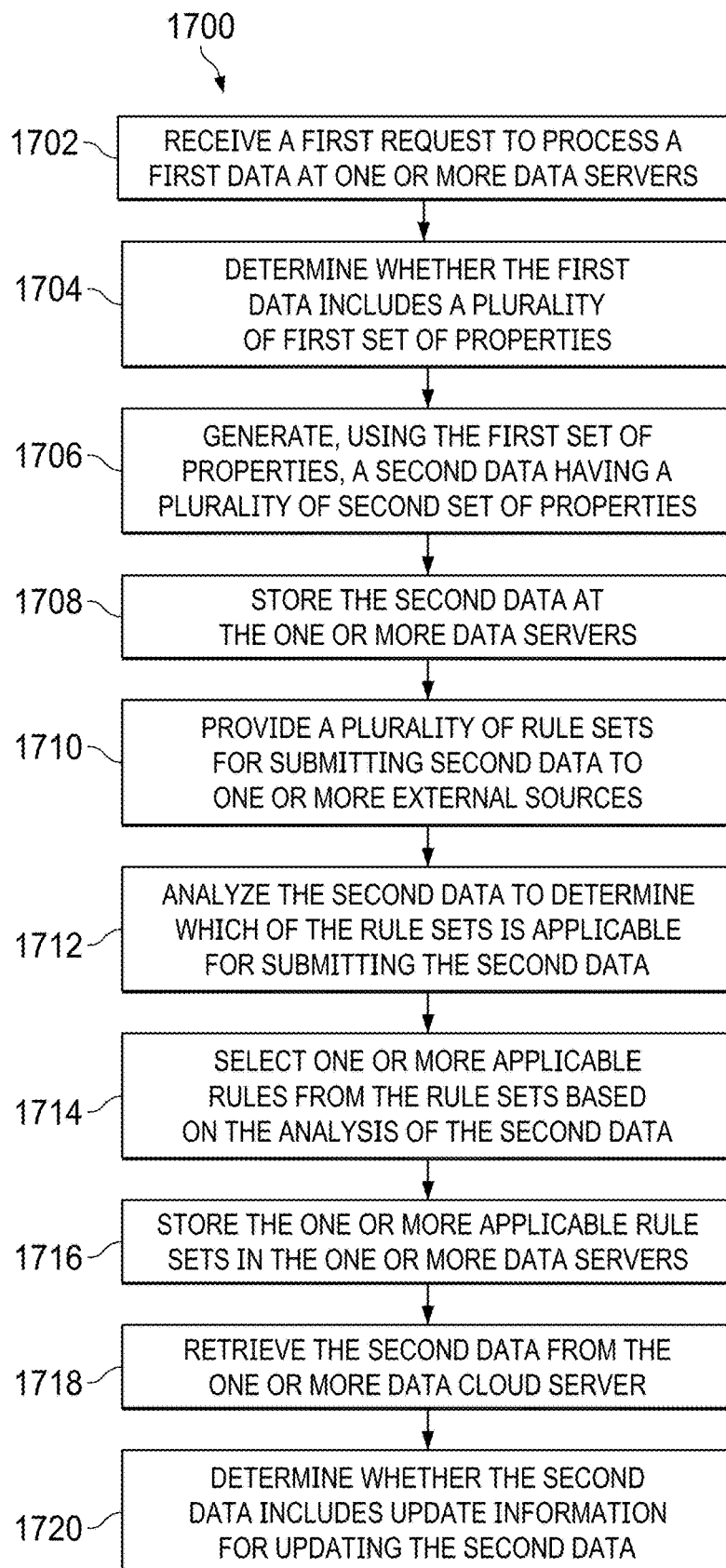
FIGS. 17A-17B show flowcharts illustrating method for submitting data in a computer network, according to one embodiment.
Figure 17B:
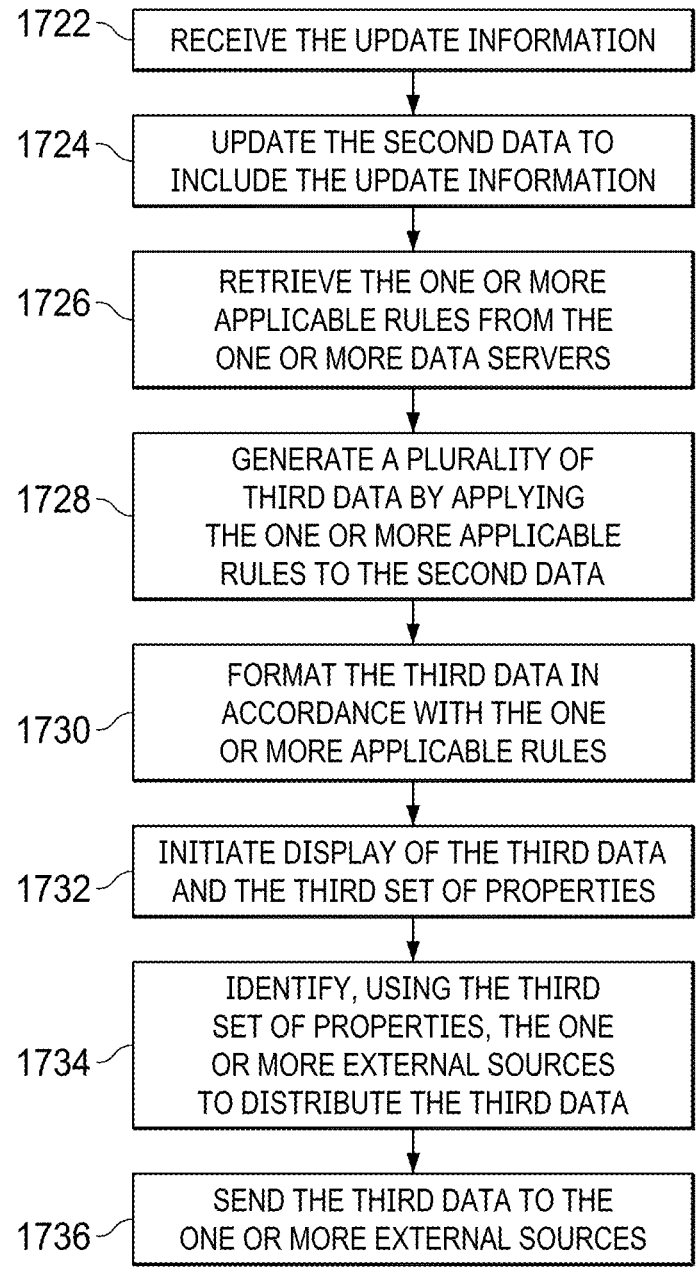

FIGS. 17A-17B show flowcharts 1700 illustrating method for submitting data in a computer network, according to one embodiment. In block 1702, the method includes receiving, using one or more computing device processors, a first request to process a first data at one or more data servers. At block 1704, the method includes determining, using the one or more computing device processors, whether the first data includes a plurality of first set of properties. At block 1706, the method includes generating, using the one or more computing device processors and the first set of properties, a second data having a plurality of second set of properties. At block 1708, the method includes storing, using the one or more computing device processors, the second data at the one or more data servers, wherein the one or more data servers store the second data.

At block 1710, the method includes providing, using the one or more computing device processors, at least one rule set for submitting second data to one or more external sources, wherein each of the at least one rule set comprises one or more rule parameters for submitting the second data. The method includes analyzing, using the one or more computing device processors, the second data to determine which one or more rules from the at least one rule set is applicable for submitting the second data to the one or more external sources, as shown at block 1712. Also, the method includes selecting, using the one or more computing device processors, one or more applicable rules from the at least one rule set based on the analysis of the second data, as shown at block 1714. At block 1716, the method includes storing, using the one or more computing device processors, the one or more applicable rules in the one or more data servers.

At block 1718, the method includes retrieving, using the one or more computing device processors, the second data from the one or more data servers. Moreover, the method includes determining, using the one or more computing device processors, whether the second data includes update information for updating the second data, as shown at block 1720. Also, the method includes, in response to the user entering the update information for the second data, receiving, using the one or more computing device processors, the update information, as shown at block 1722. At block 1724, the method includes, in response to receiving the update information, updating, using the one or more computing device processors, the second data to include the update information.

At block 1726, the method includes retrieving, using the one or more computing device processors, the one or more applicable rules from the one or more data servers. The method includes generating, using the one or more computing device processors, a plurality of third data by applying the one or more applicable rules to the second data, wherein the third data comprises a plurality of third set of properties, as shown at block 1728. Moreover, the method includes formatting, using the one or more computing device processors, the third data in accordance with the one or more applicable rules, as shown at block 1730.

At block 1732, the method includes initiating, using the one or more computing device processors, display of the third data and the third set of properties. The method includes identifying, using the one or more computing device processors and the third set of properties, the one or more external sources to distribute the third data, as shown at block 1734. Moreover, the method includes sending, using the one or more computing device processors, the third data to the one or more external sources, as shown at block 1736.

In some implementations, when determining whether the first data includes the first set of properties, the one or more data cloud server may parse the first data to assess if the first data includes the first set of properties. In some implementations, the one or more data servers may receive an indication from the user of one or more locations of the one or more data servers for retrieving the first data.

In some implementations, when generating the second data, the one or more data servers may format the first data to be in accordance with a format used by the second data. In some implementations, when providing the at least one rule set, the one or more data servers may retrieve the at least one rule set from the one or more data servers. In some implementations, when analyzing the second data, the one or more data servers may parse the second data to analyze the second set of properties.

In some implementations, when selecting the one or more applicable rules, the one or more data servers may determine which of the second set of properties apply to the one or more applicable rules based on the analysis of the second set of properties. In some implementations, when generating the third data, the one or more data servers may assign one or more values to at least one of the third set of properties using the one or more applicable rules. In some implementations, when generating the third data, the one or more data servers may produce one or more reports for transmission based on applying the one or more applicable rules to the second data. In some implementations, when identifying the one or more external sources, the one or more data servers may determine, using the at least one of the third set of parameters, whether the third data is sent to the one or more external source expeditiously.

In some implementations, when identifying the one or more external sources, the one or more data servers may determine, using the at least one of the third set of parameters, whether the third data includes downgrade information of the second data. In some implementations, when identifying the one or more external sources, the one or more data servers may determine, using the at least one of the third set of parameters, the timeframe for sending the third data. In some implementations, when sending the third data, the one or more data servers may determine, using the at least one of the third set of parameters, a process for sending the third data In some implementations, a user interface may be provided for allowing the user to select one or more locations of the one or more data servers for retrieving the first data. In some implementations, a user interface may be provided for displaying details of the first data. In some implementations, a user interface may be provided for editing information of the first data. In some implementations, the user interface may display and update information regarding the first information. In some implementations, a user interface may be provided for displaying details of the at least one rule set. In some instance, a user interface may be provided displaying details of the third data.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for submitting data in a computer network, the method comprising:

receiving, using one or more computing device processors, a first request to process a first data at one or more data servers;

determining, using the one or more computing device processors, whether the first data includes a plurality of first set of properties;

generating, using the one or more computing device processors and the plurality of the first set of properties, a second data having a plurality of second set of properties;

storing, using the one or more computing device processors, the second data at the one or more data servers;

providing, using the one or more computing device processors, at least one rule set for submitting second data to one or more external sources, wherein each of the at least one rule set comprises one or more rule parameters for submitting the second data;

analyzing, using the one or more computing device processors, the plurality of the second set of properties of the second data to determine which one or more rules from the at least one rule set is applicable for submitting the second data to the one or more external sources, wherein the one or more rules include one or more applicable rules for managing downgrade information of the second data;

selecting, using the one or more computing device processors, the one or more applicable rules for managing the downgrade information of the second data from the at least one rule set based on the analysis of the second data;

storing, using the one or more computing device processors, the one or more applicable rules for managing the downgrade information of the second data in the one or more data servers;

retrieving, using the one or more computing device processors, the second data from the one or more data servers;

determining, using the one or more computing device processors, whether the second data includes the downgrade information for updating the second data;

in response to a user entering the downgrade information for the second data, receiving, using the one or more computing device processors, the downgrade information;

in response to receiving the downgrade information, updating, using the one or more computing device processors, the second data to include the downgrade information;

retrieving, using the one or more computing device processors, the one or more applicable rules for managing the downgrade information of the second data from the one or more data servers;

generating, using the one or more computing device processors, a plurality of third data by applying the one or more applicable rules for managing the downgrade information of the second data to the second data, wherein the plurality of third data comprises a plurality of third set of properties;

formatting, using the one or more computing device processors, the plurality of third data in accordance with the one or more applicable rules for managing the downgrade information of the second data;

initiating, using the one or more computing device processors, display of the plurality of third data and the plurality of the third set of properties;

identifying, using the one or more computing device processors and the plurality of the third set of properties, the one or more external sources to distribute the plurality of the third data; and sending, using the one or more computing device processors, the plurality of the third data to the one or more external sources based on at least one of the plurality of the third set of properties.

2. The method of claim 1, wherein determining whether the first data includes the plurality of the first set of properties comprises parsing the first data to assess if the plurality of the first data includes the first set of properties.

3. The method of claim 2, wherein receiving the first request to process the first data comprises receiving an indication from the user of one or more locations of the one or more data servers for retrieving the first data.

4. The method of claim 1, wherein generating the second data comprises formatting the first data to be in accordance with a format of the second data.

5. The method of claim 1, wherein providing the at least one rule set comprises retrieving the at least one rule set from the one or more data servers.

6. The method of claim 1, wherein analyzing the second data comprises determining whether the downgrade information is associated with a lowering in severity of an event identified in an event field in the second data.

7. The method of claim 1, wherein selecting the one or more applicable rules for managing the downgrade information of the second data comprises determining which of the second set of properties apply to the one or more applicable rules for managing the downgrade information of the second data based on the analysis of the plurality of the second set of properties.

8. The method of claim 1, wherein generating the plurality of the third data comprises assigning one or more values to the at least one of the plurality of the third set of properties using the one or more applicable rules for managing the downgrade information of the second data.

9. The method of claim 1, wherein generating the plurality of the third data comprises producing one or more reports for transmission based on applying the one or more applicable rules for managing the downgrade information of the second data to the second data.

10. The method of claim 1, wherein identifying the one or more external sources comprises determining, using the at least one of the plurality of the third set of properties, whether the plurality of the third data comprises the downgrade information of the second data that is sent to the one or more external sources.

11. The method of claim 1, wherein identifying the one or more external sources comprises determining, using the at least one of the plurality of the third set of properties, whether the plurality of the third data includes an indication of a level of the downgrade information of the second data.

12. The method of claim 1, wherein identifying the one or more external sources comprises determining, using the at least one of the plurality of the third set of properties, a timeframe for sending the plurality of the third data.

13. The method of claim 1, wherein sending the third data comprises determining, using the at least one of the plurality of the third set of properties, a process for sending the plurality of the third data.

14. A system for submitting data in a computer network, the system comprising:

one or more computing device processors; and one or more computing device memories, coupled to the one or more computing device processors, the one or more computing device memories storing instructions executed by the one or more computing device processors, wherein the instructions are configured to:

receive a first request to process a first data at one or more data servers;

determine whether the first data includes a plurality of first set of properties;

generate, using the plurality of the first set of properties, a second data having a plurality of second set of properties;

store the second data at the one or more data servers;

provide a plurality of rule sets for submitting the second data to one or more external sources, wherein each of the plurality of rule sets comprises one or more rule parameters for submitting the second data;

analyze the plurality of the second set of properties of the second data to determine which one or more rules from the at least one rule set from the plurality of rule sets is applicable for submitting the second data to the one or more external sources, wherein the one or more rules include one or more applicable rules for managing downgrade information of the second data;

select the one or more applicable rules for managing the downgrade information of the second data from the plurality of the rule sets based on the analysis of the second data;

store the one or more applicable rules for managing the downgrade information of the second data in the one or more data servers;

retrieve the second data from the one or more data servers;

determine whether the second data includes the downgrade information for updating the second data;

in response to a user entering the downgrade information for the second data, receive the downgrade information;

in response to receiving the downgrade information, update the second data to include the downgrade information;

retrieve the one or more applicable rules for managing the downgrade information of the second data from the one or more data servers;

generate a plurality of third data by applying the one or more applicable rules for managing the downgrade information of the second data to the second data, wherein the plurality of the third data comprises a plurality of third set of properties;

format the plurality of the third data in accordance with the one or more applicable rules for managing the downgrade information of the second data;

initiate display of the plurality of the third data and the plurality of the third set of properties;

identify, using the plurality of the third set of properties, the one or more external sources to distribute the plurality of the third data; and send the plurality of the third data to the one or more external sources.

15. The system of claim 14, wherein the instructions are further configured to provide a user interface for allowing the user to select one or more locations of the one or more data servers for retrieving the first data.

16. The system of claim 14, wherein the instructions are further configured to provide a user interface for displaying details of the first data.

17. The system of claim 14, wherein the instructions are further configured to provide a user interface for editing information of the first data.

18. The system of claim 14, wherein the instructions are further configured to provide a user interface for displaying details of at least one rule set from the plurality of rule sets.

19. The system of claim 14, wherein the instructions are further configured to provide a user interface for displaying details of the plurality of third data.

20. A method for submitting data in a computer network, the method comprising:

receiving, using one or more computing device processors, a first request to process a first data at one or more data cloud servers;

determining, using the one or more computing device processors, whether the first data includes at least one of a first set of properties;

generating, using the one or more computing device processors and the at least one of the first set of properties, a second data having at least one of a second set of properties;

storing, using the one or more computing device processors, the second data at the one or more data cloud servers;

providing, using the one or more computing device processors, at least one rule set for submitting second data to one or more external sources, wherein the at least one rule set comprises at least one rule parameter for submitting the second data;

analyzing, using the one or more computing device processors, the at least one of the second set of properties of the second data to determine at least one rule from the at least one rule set is applicable for submitting the second data to the one or more external sources, wherein the at least one rule includes at least one applicable rule for managing downgrade information of the second data;

selecting, using the one or more computing device processors, the at least one applicable rule for managing the downgrade information of the second data from the at least one rule set for managing the downgrade information of the second data based on the analysis of the second data;

storing, using the one or more computing device processors, the at least one applicable rule for managing the downgrade information of the second data in the one or more data cloud servers;

retrieving, using the one or more computing device processors, the second data from the one or more data cloud servers;

determining, using the one or more computing device processors, whether the second data includes the downgrade information for updating the second data;

in response to a user entering information for the second data, receiving, using the one or more computing device processors, the downgrade information;

in response to receiving the downgrade information, updating, using the one or more computing device processors, the second data to include the downgrade information;

retrieving, using the one or more computing device processors, the at least one applicable rule for managing the downgrade information of the second data from the one or more data cloud servers;

generating, using the one or more computing device processors, a plurality of third data by applying the at least one applicable rule for managing the downgrade information of the second data to the second data, wherein the plurality of third data comprises at least one of a third set of properties;

formatting, using the one or more computing device processors, the plurality of third data in accordance with the at least one applicable rule for managing the downgrade information of the second data;

initiating, using the one or more computing device processors, display of the plurality of third data and the at least one of the third set of properties;

identifying, using the one or more computing device processors and the at least one third set of properties, the one or more external sources to distribute the plurality of third data; and sending, using the one or more computing device processors, the plurality of third data to the one or more external sources.

\* \* \* \* \*